United States Patent
Lee et al.

(10) Patent No.: US 10,948,949 B2
(45) Date of Patent: Mar. 16, 2021

(54) ELECTRONIC APPARATUS HAVING A HOLE AREA WITHIN SCREEN AND CONTROL METHOD THEREOF

(71) Applicant: Samsung Electronics Co., Ltd., Gyeonggi-do (KR)

(72) Inventors: Jong-moo Lee, Seoul (KR); Seung-min Choi, Seongnam-si (KR); Dae-hyun Kim, Hwaseong-si (KR); So-young Kim, Suwon-si (KR); Min-sik Kim, Yongin-si (KR); Geon-soo Kim, Suwon-si (KR); Jin-wan An, Daegu (KR); Ji-woo Lee, Daegu (KR); Hyun-suk Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/585,150

(22) Filed: Sep. 27, 2019

(65) Prior Publication Data
US 2020/0026335 A1  Jan. 23, 2020

Related U.S. Application Data

(63) Continuation of application No. 15/650,422, filed on Jul. 14, 2017, now Pat. No. 10,429,905.

(30) Foreign Application Priority Data

Oct. 27, 2016  (KR) .......................... 10-2016-0141115

(51) Int. Cl.
*G06F 1/16* (2006.01)
*G06F 3/0488* (2013.01)
(Continued)

(52) U.S. Cl.
CPC .......... *G06F 1/1692* (2013.01); *G06F 1/1639* (2013.01); *G06F 1/1643* (2013.01);
(Continued)

(58) Field of Classification Search
CPC ........................ G06F 3/04886; G09G 2340/04
See application file for complete search history.

(56) References Cited

U.S. PATENT DOCUMENTS

| 9,229,681 B2 | 1/2016 | Cho et al. |
| 2005/0128217 A1* | 6/2005 | Cohen ..................... G06T 11/00 345/603 |

(Continued)

FOREIGN PATENT DOCUMENTS

| JP | 2014-71124 A | 4/2014 |
| JP | 2014-172363 A | 9/2014 |

(Continued)

*Primary Examiner* — Mark W Regn
(74) *Attorney, Agent, or Firm* — Cha & Reiter, LLC

(57) ABSTRACT

An electronic apparatus having a hole area and a controlling method of are provided. More particularly, an electronic apparatus having a hole area which may enlarge an image or application screen through analysis and a method for controlling a hole area of an electronic apparatus are provided. Some embodiments provide an electronic apparatus having a hole area, capable of analyzing an edge (or edge of an application screen) of an image and displaying on one of an entire area or a main area and a method for controlling a hole area of the electronic apparatus. In addition to above, various exemplary embodiments are available.

20 Claims, 26 Drawing Sheets

(51) Int. Cl.
*G06F 3/147* (2006.01)
*G06F 3/0484* (2013.01)

(52) U.S. Cl.
CPC .......... *G06F 1/1647* (2013.01); *G06F 1/1675* (2013.01); *G06F 1/1686* (2013.01); *G06F 3/0488* (2013.01); *G06F 3/04845* (2013.01); *G06F 3/04886* (2013.01); *G06F 3/147* (2013.01); *G09G 2300/04* (2013.01); *G09G 2340/04* (2013.01)

(56) References Cited

U.S. PATENT DOCUMENTS

| | | |
|---|---|---|
| 2012/0169774 A1 | 7/2012 | Yu |
| 2013/0094126 A1* | 4/2013 | Rappoport ............. G02B 5/208 |
| | | 361/679.01 |
| 2013/0234982 A1* | 9/2013 | Kang .................... G06F 3/0488 |
| | | 345/174 |
| 2014/0184526 A1 | 7/2014 | Cho |
| 2014/0200896 A1 | 7/2014 | Lee et al. |
| 2014/0289668 A1* | 9/2014 | Mavrody .............. G06F 1/1643 |
| | | 715/781 |
| 2014/0350925 A1 | 11/2014 | Park et al. |
| 2015/0145797 A1 | 5/2015 | Corrion |
| 2015/0161099 A1* | 6/2015 | Lee ........................ G06F 9/454 |
| | | 345/171 |
| 2015/0256896 A1 | 9/2015 | Ellis et al. |

FOREIGN PATENT DOCUMENTS

| | | | |
|---|---|---|---|
| JP | 10-1456974 B1 | 10/2014 | |
| KR | 10-2006-0068229 A | 6/2006 | |
| KR | 10-2014-0096202 A | 8/2014 | |
| KR | 10-2016-0039830 A | 4/2016 | |
| WO | WO-2016134194 A1 * | 8/2016 | ............. G06F 1/181 |

* cited by examiner

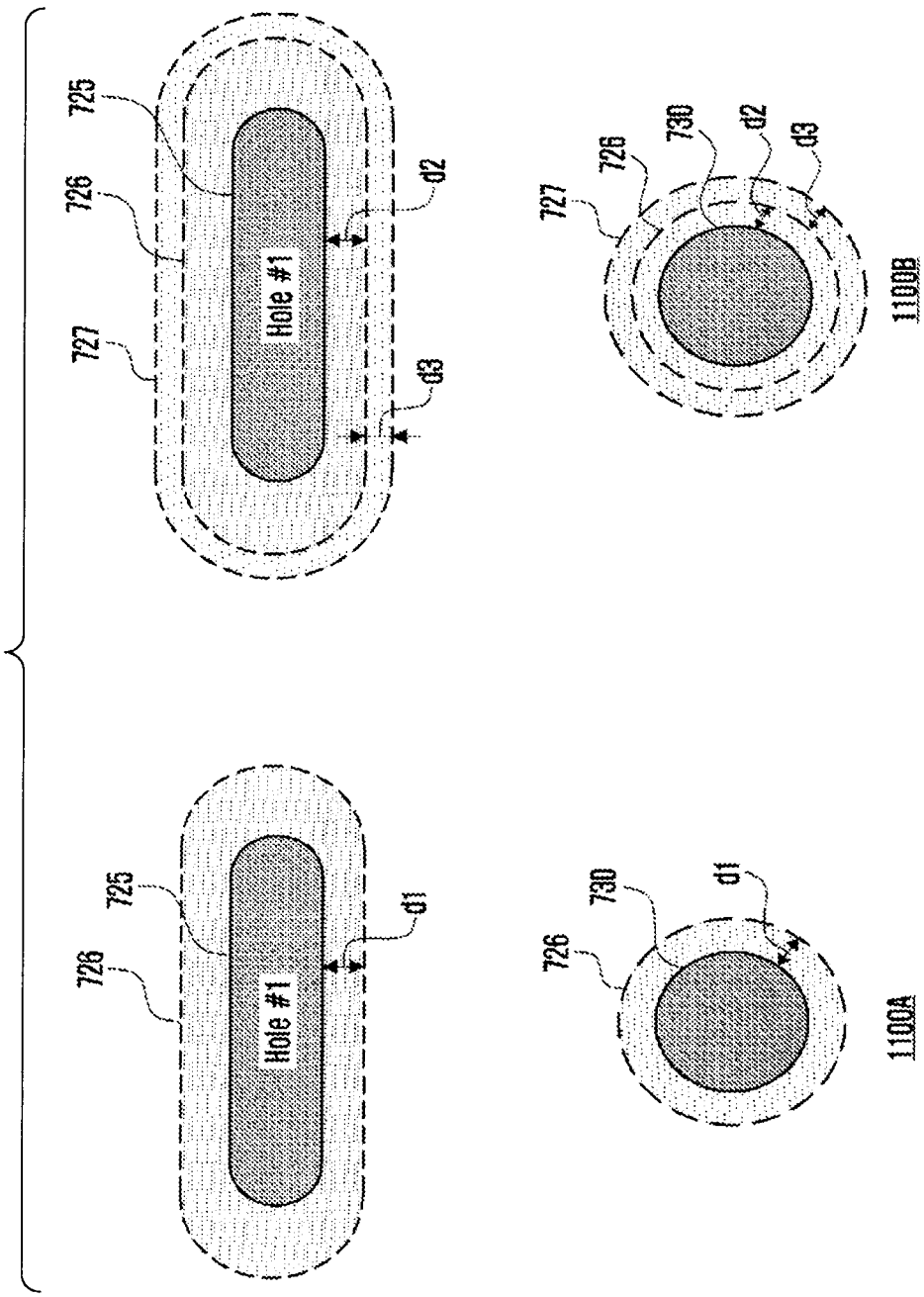

ELECTRONIC APPARATUS HAVING A HOLE AREA WITHIN SCREEN AND CONTROL METHOD THEREOF

CROSS-REFERENCE TO RELATED APPLICATIONS

This application is a Continuation of U.S. patent application Ser. No. 15/650,422 filed on Jul. 14, 2017 which under 35 U.S.C. § 119(a) from Korean Patent Application No 10-2016-0141115, filed on Oct. 27, 2016, in the Korean Intellectual Property Office, the disclosure of which is incorporated herein by reference in its entirety.

BACKGROUND

1. Field

Apparatuses and methods consistent with exemplary embodiments relate to an electronic apparatus having a hole area and a method for controlling thereof.

2. Description of the Related Art

With development of the technologies, an electronic apparatus may provide various services and functions including not only calling and data transmission but also multitasking and others using various applications.

SUMMARY

Exemplary embodiments may overcome the above disadvantages and other disadvantages not described above. However, it is understood that the exemplary embodiments are not required to overcome the disadvantages described above, and may not overcome any of the problems described above.

In an electronic apparatus having a screen at a front side, a size of the screen has become larger, and such an electronic apparatus can provide various services to a user using this larger screen. Increase in a size of a screen is restricted by a camera, a receiver, a sensor positioned on an upper end of a front side or a home button positioned on a lower end of a front side, etc.

According to various exemplary embodiments, an electronic apparatus which has a hole area which is capable of enlarge a content through a display having a main area and an enlarged area and a controlling method thereof are provided.

A controlling method of a hole area of an electronic apparatus according to an exemplary embodiment includes selecting a displayed content, determining one of interference enlargement and non-interference enlargement through edge analysis of the content, and enlarging the content to one of the interference enlargement and non-interference enlargement, and the hole area is formed by one of a camera, receiver, optical sensor, and a home button.

The electronic apparatus according to an exemplary embodiment includes a display having a main area and an enlarged area, a hole area disposed in the enlarged area, and a processor which controls the display, and the processor analyzes an edge area of the selected content and controls to display the content on the display area by enlarging the content by one of the interference enlargement and the non-interference enlargement according to an analysis result.

In an exemplary embodiment, there is an electronic apparatus, including: a housing including a first side in a first direction and a second side in a second direction which is opposite to the first direction; a touch screen display configured to be disposed between a first side and a second side, to be exposed through a first side, the touch screen display including a main area and an enlarged area a hole area configured to be located in the enlarged area; at least one processor configured to be in communication with the display; and a memory configured to be electrically connected with the processor, wherein the memory stores at least one command that is executed by the processor when a function is executed, and wherein the processor is further configured to analyze an edge area of a selected content, enlarge in an enlargement, the selected content by at least one from among interference enlargement and non-interference enlargement, and display the enlarged content on a display area.

In yet another exemplary embodiment, a method of controlling a hole area of an electronic apparatus including at least one hole area on a display, the method including: selecting a displayed content; determining at least one from among interference enlargement and non-interference enlargement through edge analysis of the selected content; and enlarging the selected content to at least one from among the interference enlargement and non-interference enlargement, wherein the hole area is formed by at least one from among a camera, a receiver, an optical sensor, and a home button.

According to various exemplary embodiments, an electronic apparatus which has a hole area which can enlarge a content through a display having a main area and an enlarged area and a method for controlling a hole area are provided to provide a user with natural screen usability.

BRIEF DESCRIPTION OF THE DRAWINGS

The above and/or other aspects will be more apparent by describing in detail exemplary embodiments with reference to the accompanying drawings, in which:

FIGS. 11A to 11F are views illustrating an example of a method for controlling an electronic apparatus according to another exemplary embodiment.

DETAILED DESCRIPTION OF THE EXEMPLARY EMBODIMENTS

Figure 1:
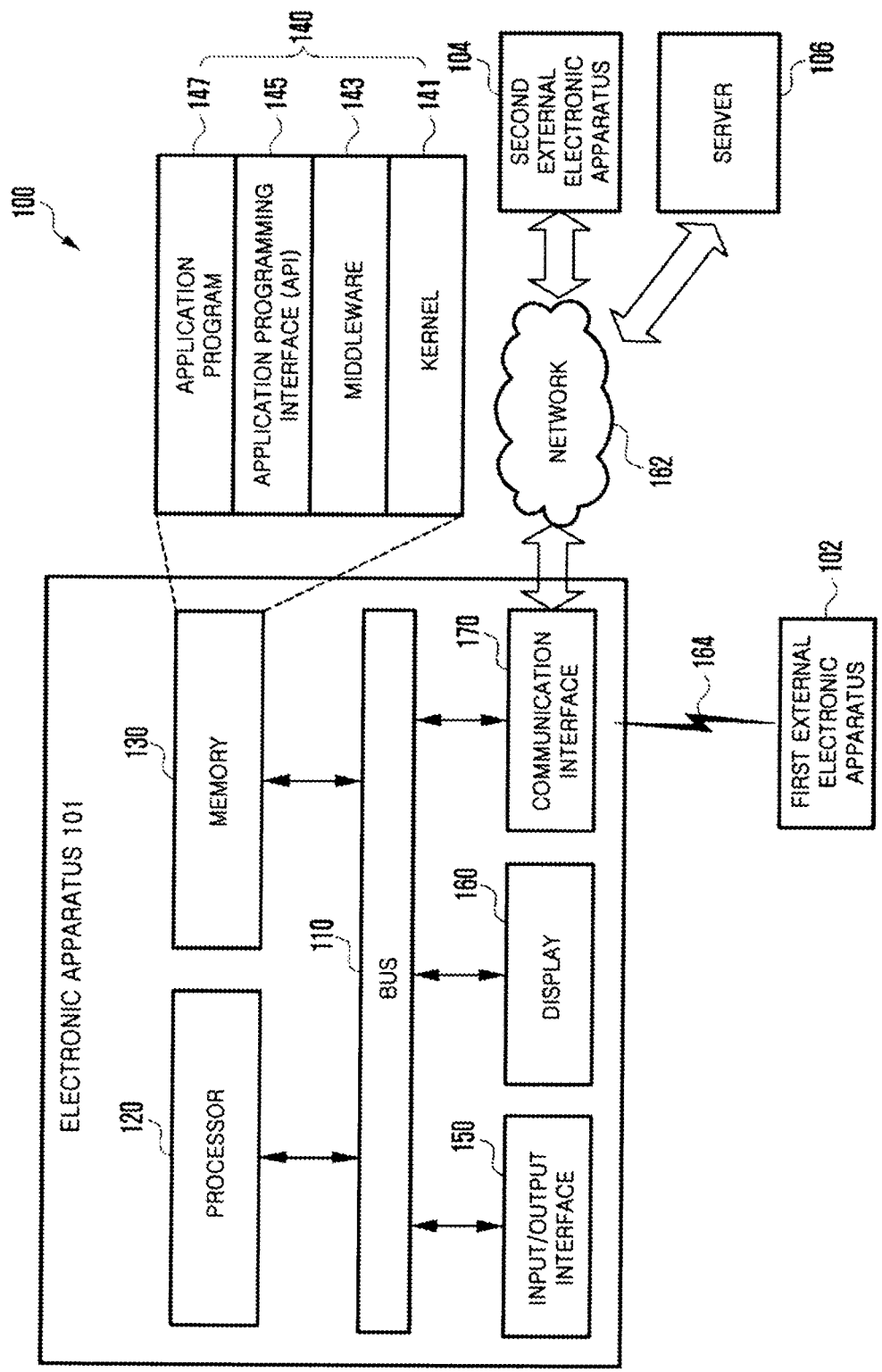
FIG. 1 is a view illustrating network environment including an electronic apparatus according to various exemplary embodiments.

Hereinafter, exemplary embodiments will be described in more detail with reference to the accompanying drawings.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

In the following description, the same reference numerals are used for the same elements, even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

The terms used herein are selected from the general terms that are widely used at present and in consideration of the functions in the present disclosure, but at the same time, the terms may vary depending on the intent of those skilled in the art or the precedents, or by the emergence of new technologies. Further, certain terms may be arbitrarily chosen, in which case the corresponding meaning will be described in detail in the disclosure. Accordingly, the terms used herein will be defined not simply based on the names of the terms, but based on the meanings of the terms and the context throughout the description.

The example embodiments of the present disclosure may have a variety of modifications and several examples. Accordingly, while various example embodiments are described in detail herein, these are not intended to limit the scope of the present disclosure to the particular example embodiments only. Rather, it should be understood that the example embodiments encompass all the modifications, equivalents or replacements that fall under the concept and technology scope as disclosed. In describing the example embodiments, well-known functions or constructions may not be described in detail when they obscure the disclosure with unnecessary detail. Further, the terms described below are those that are defined in consideration of the functions of the present disclosure and may be varied according to users, operators or practices. Accordingly, definitions will have to be made based on the content provided throughout the description.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, step, operation, element, component, or a combination thereof, and not to preclude a presence or a possibility of adding one or more of other characteristics, numbers, steps, operations, elements, components or a combination thereof.

In the example embodiments of the present disclosure, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor (not illustrated).

An electronic apparatus according to various exemplary embodiments may include at least one of, for example, smartphone, tablet PC, mobile phone, video phone, e-book reader, desktop PC, laptop PC, netbook computer, workstation, server, PDA, portable multimedia player (PMP), MP3 player, medical device, camera, or a wearable device. A wearable device may include at least one of an accessory type (e.g.: watch, ring, bracelet, ankle bracelet, necklace, glasses, contact lens, or head-mounted-device (HMD)), fabric or cloth-embedded type (e.g.: e-cloth), body-attached type (e.g.: skin pad or tattoo), or bioimplant circuit.

In some exemplary embodiments, an electronic apparatus may include, for example, at least one of television, digital video disk (DVD) player, audio, refrigerator, air-conditioner, cleaner, oven, microwave, washing machine, air cleaner, set top box, home automation control panel, security control panel, media box (ex: Samsung HomeSync™, Apple V™, or Google TV™), game console (ex: Xbox™, PlayStation™), e-dictionary, e-key, camcorder, or e-frame.

In another exemplary embodiment, an electronic apparatus may include various medical devices (ex: various portable medical measuring devices (blood glucose monitor, heart rate monitor, blood pressure measuring device, or body temperature measuring device, etc.), magnetic resonance angiography (MRA), magnetic resonance imaging (MRI), computed tomography (CT), photographing device, or ultrasonic device, etc.), navigator, global navigation satellite system (GNSS), event data recorder (EDR), flight data recorder (FDR), vehicle info-tainment device, e-device for ships (ex: navigation device for ship, gyrocompass, etc.), avionics, security device, head unit for vehicles, industrial or home-use robots, drone. ATM of financial institutions, point of sales (POS) of shops, or internet of things device (ex: bulb, sensors, sprinkler, fire alarm, temperature controller, streetlight, toaster, sporting goods, hot water tank, heater, boiler, etc.). According to some exemplary embodiments, an electronic apparatus may include at least one of furniture, a part of a building/construction or vehicle, electronic board, electronic signature receiving device, projector, or various measuring devices (ex: water, electricity, gas, or wave measuring device, etc.). In various exemplary embodiments an electronic apparatus may be flexible or be combination of two or more of the aforementioned various devices. The electronic apparatus according to an exemplary embodiment is not limited to the aforementioned devices. In this disclosure, the term "a user" may indicate a person using an electronic apparatus or an apparatus which uses an electronic apparatus (for example, artificial intelligent electronic apparatus).

A data recognition model construction apparatus 100 and a data recognition apparatus 200 which are to be described may be embodied as a software module or prepared as a hardware chip and can be provided on various electronic apparatuses. For example, the data recognition model construction apparatus 100 and the data recognition apparatus 200 may be manufactured as hardware chip exclusively for artificial intelligence (AI), or manufactured as a part of the existing common use processor (ex: CPU or application processor) or graphic processor (ex: GPU), and can be provided on the aforementioned e-devices.

Referring to FIG. 1, an electronic apparatus 101 in network environment 100 is disclosed according to various exemplary embodiments. The electronic apparatus 101 may include bus 110, processor 120, memory 130, input/output interface 150, display 160, and communication interface 170. In some exemplary embodiments, the electronic apparatus 101 may omit one of the elements or add another element. The bus 110 may include a circuit which interconnects elements 110-170, and delivers communication (for example, a control message or data) among the elements.

The processor 120 may include at least one of a central processing apparatus, an application processor, or a communication processor (CP). The processor 120, for example, may process computation or data processing with respect to control and/or communication among at least one other element of the electronic apparatus 101.

The memory 130 may include a volatile and/or non-volatile memory. The memory 130 may, for example store a command related to at least one other element of the electronic apparatus 101, or data. According to an exemplary embodiment, the memory 130 may store software and/or a program 140.

The program 140 may, for example, include a kernel 141, a middleware 143, an application programming interface (API) 145, and/or an application program (or "application") 147, etc. At least part of the kernel 141, the middleware 140, or the API 145 may be referred to as an operating system (OS).

The kernel 141 may, for example, control or manage system resources (e.g. the bus 110, the processor 120, or the memory 130, etc.) used for executing an operation or function realized in other programs (e.g. the middleware 143, the API 145, or the application 147). The kernel 141 may provide an interface capable of controlling or managing system resources by accessing individual elements of the electronic apparatus 101 from the middleware 143, the API 145, or the application 147.

The middleware 143 may, for example, act as an intermediary so that the API 145 and the application 147 could communicate and exchange data with the kernel 141. The middleware 143 may process one or more operation requests received from the application 147 according to a priority. For example, the middleware 143 may assign at least one of the application 147 a priority to use a system resource (e.g. bus 110, processor 120, or memory 130, etc.) of the electronic apparatus 101. For example, the middleware 143 perform scheduling or load balancing, etc. with respect to the one or more operation requests by processing the at least one operation requests according to the assigned priority.

The API 145 is, for example, an interface to control, by the application 147, functions provided by the kernel 141 or the middleware 143, which may include at least one interface or function (e.g. instruction) for file control, window control, image processing, or character control, etc.

The input/output interface 150 may, for example, play a role of an interface capable of conveying a command or data input from a user or another external apparatus to another element(s) of the electronic apparatus 101. The input/output interface 150 may output the command or data received from another element(s) of the electronic apparatus 101 to a user or another external apparatus.

The display 160 may, for example, include a liquid crystal display (LCD), a light-emitting diode (LED) display, an organic light-emitting diode (OLED) display, a microelectromechanical systems (MEMS) display, or an electronic paper display. The display 160 may, for example, display various contents (e.g. text, image, video, icon, or symbol, etc.) to a user. The display 160 may include a touch screen, and may, for example, receive a touch input using an electronic pen or using a body part of a user, a gesture, a proximity, or hovering.

The communication interface 170 may, for example, set a communication between the electronic apparatus 101 and an external apparatus (e.g. a first external electronic apparatus 102, a second external electronic apparatus 104 or a server 106). For example, the communication interface 170 may be connected to a network 162 via a wireless communication or a wired communication to communicate with an external apparatus (e.g. the second external electronic apparatus 104 or the server 106).

Wireless communication may include cellular communication which uses at least one of, for example, LTE. LTE Advance (LTE-A), code division multiple access (CDMA), wideband CDMA (WCDMA), universal mobile telecommunications system (UMTS), Wireless Broadband (WiBro), or Global System for Mobile Communications (GSM). According to an exemplary embodiment, wireless communication may include at least one of, for example, wireless fidelity (WiFi), Bluetooth, Bluetooth Low Energy (BLE), Zigbee, near field communication (NFC), Magnetic Secure Transmission, radio frequency RF, or body area network BAN.

According to an exemplary embodiment, wireless communication may include GNSS. GNSS may be, for example, Global Positioning System (GPS), Global Navigation Satellite System (Glonass), Beidou Navigation Satellite System (Beidou) or Galileo, the European global satellite-based navigation system. Hereinafter, "GPS" can be used as "GNSS" interchangeably.

Wired communication may include at least one of, for example, universal serial bus (USB), high definition multimedia interface (HDMI), recommended standard232 (RS-232), power line communication, or plain old telephone service (POTS).

Network 162 may include at least one of telecommunication network, for example, computer network (for example, LAN or WAN), Internet, or telephone network.

Each of the first and second external electronic apparatuses 102 and 104 may be an apparatus of the same or different type of the electronic apparatus 101. According to various exemplary embodiments, all or some of operations executed in the electronic apparatus 101 may be executed in another electronic apparatus or a plurality of electronic apparatuses (e.g. first and second external electronic apparatuses 102, 104 or server 106).

According to an exemplary embodiment, when the electronic apparatus 101 is to perform a function or a service automatically or per request, the electronic apparatus 101 may request another apparatus (e.g. first and second external electronic apparatuses 102, 104 or server 106) to perform at least some of the functions related to the function or service either additionally or instead of executing the function or service by itself. The another electronic apparatus (e.g. first and second external electronic apparatuses 102, 104 or server 106) may execute the requested function or additional function, and transmit the result to the electronic apparatus 101. The electronic apparatus 101 may process the received result as it is or additionally process the received result to provide the requested function or service. To that end, for example, a cloud computing, distributed computing or client-server computing technology may be used.

Figure 2:
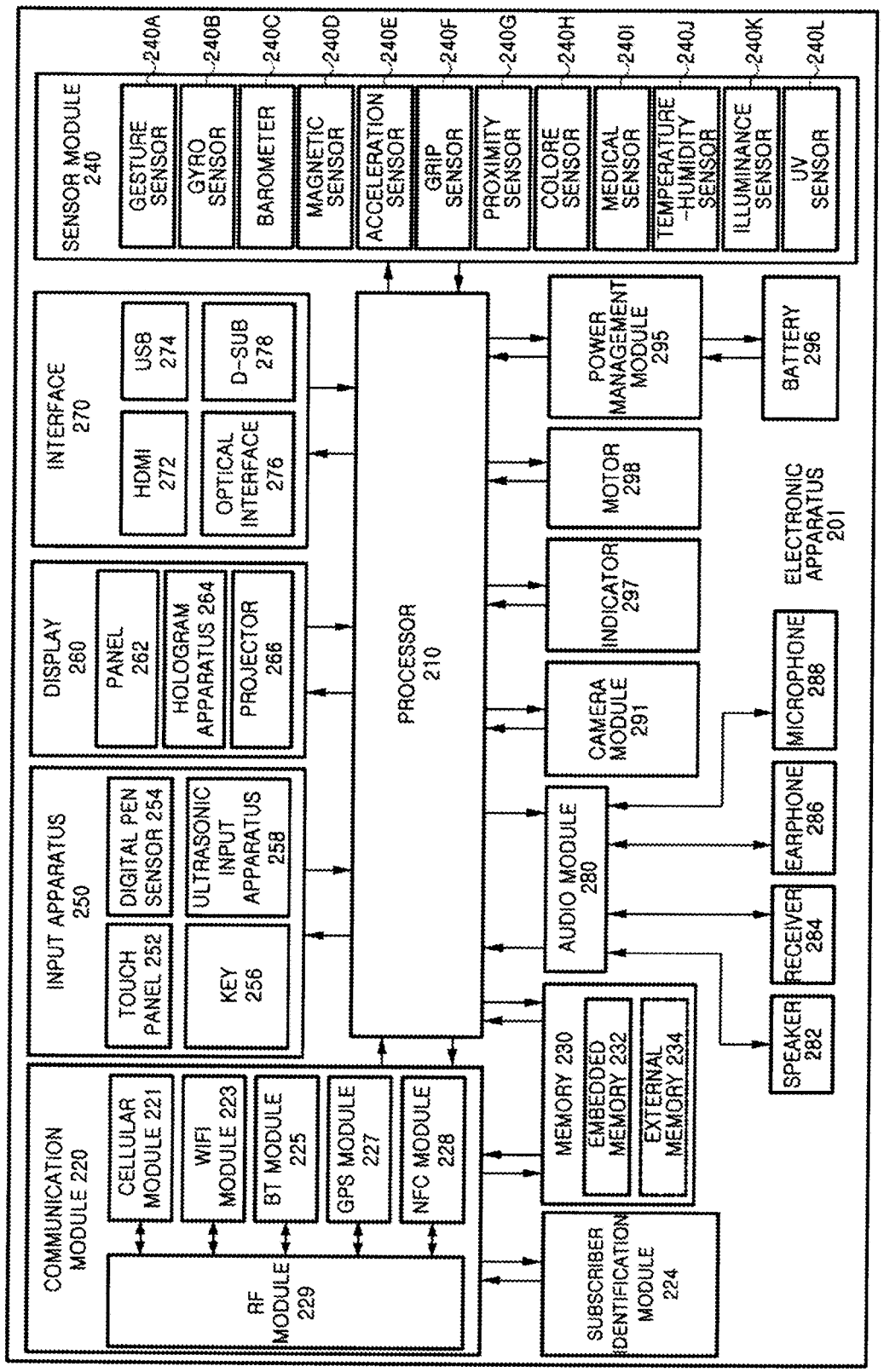
FIG. 2 is a block diagram of the electronic apparatus according to various exemplary embodiments.

FIG. 2 is a block diagram of the electronic apparatus 201 according to various exemplary embodiments. The electronic apparatus 201 may, for example, include all or some of the electronic apparatus 101 illustrated in FIG. 1. The electronic apparatus 201 may include at least one processor 210 (e.g. application processor (AP)), a communication module 220, a subscriber identification module 224, a memory 230, a sensor module 240, an input apparatus 250, a display 260, an interface 270, an audio module 280, a camera module 291, a power management module 295, a battery 296, an indicator 297, and a motor 298.

The processor 210 may, for example, control a number of hardware or software elements connected to the processor 210 by driving an operating system or application program, and perform various data processing and calculations. The processor 210 may, for example, be realized as a system on chip (SoC). According to an exemplary embodiment, the processor 210 may further include a graphic processing unit (GPU) and/or an image signal processor. The processor 210 may also include at least some (e.g. cellular module 221) of the elements illustrated in FIG. 2. The processor 210 may load a command or data received from at least one of other elements (e.g. non-volatile memory) to a volatile memory to process it, and store various data in the non-volatile memory.

The communication module 220 may have a configuration that is the same as or similar to the communication interface 170, for example. The communication module 220 may, for example, include a cellular module 221, a WiFi module 223, a Bluetooth module 225, a GNSS module 227, a NFC module 228, and a radio frequency (RF) module 229.

The cellular module 221 may, for example, provide a voice call, a video call, a text messaging service, or an internet service via a communication network. According to an exemplary embodiment, the cellular module 221 may perform identification and authentication of the electronic apparatus 201 within a communication network using the subscriber identification module (e.g. subscriber identification module (SIM) card)) 224. According to an exemplary embodiment, the cellular module 221 may perform at least some of the functions providable by the processor 210. According to an exemplary embodiment, the cellular module 221 may include a communication processor (CP).

According to an exemplary embodiment, at least some (e.g. at least two) of the cellular module 221, the WiFi module 223, the Bluetooth module 225, the GNSS module 227, or the NFC module 228 may be included in one integrated chip (IC) or IC package.

The RF module 229 may, for example, transmit or receive a communication signal (e.g. RF signal). The RF module 229 may, for example, include a transceiver, a power amp module (PAM), a frequency filter, a low noise amplifier (LNA), or an antenna, etc. According to another exemplary embodiment, at least one of the cellular module 221, the WiFi module 223, the Bluetooth module 225, the GNSS module 227 and the NFC module 228 may transmit or receive an RF signal through a separate RF module.

The subscriber identification module 224 may, for example, include a card or an embedded SIM including a subscribe identification module, and include a unique identification information (e.g. integrated circuit card identifier (ICCID)) or subscriber information (e.g. international mobile subscriber identity (IMSI)).

The memory 230 may, for example, include an embedded memory 232 or an external memory 234. The embedded memory 232 may, for example, include at least one of a volatile memory (e.g. dynamic random access memory (DRAM)), a static RAM, a synchronous dynamic RAM, a non-volatile memory (e.g. one time programmable read only memory (OTPROM)), a programmable ROM (PROM), an erasable and programmable ROM (EPROM), an electrically erasable and programmable ROM (EEPROM), a mask ROM, a flash ROM, a flash memory (e.g. NAND flash or NOR flash, etc.), a hard drive, and a solid state drive (SSD).

The external memory 234 may further include a flash drive, such as a compact flash (CF), a secure digital (SD), a micro secure digital (Micro-SD), a mini secure digital (Mini-SD), an extreme digital (xD), a MultiMediaCard (MMC), or a memory stick. The external memory 234 may be connected to the electronic apparatus 201 functionally and/or physically through various interfaces.

The sensor module 240 may, for example, measure a physical quantity or detect an operational state of the electronic apparatus 201, and convert the measured or detected information into an electrical signal. The sensor module 240 may, for example, include a gesture sensor 240A, a gyro sensor 240B, a barometer 240C, a magnetic sensor 240D, an acceleration sensor 240E, a grip sensor 240F, a proximity sensor 240G, a color sensor 240H (e.g. red, green, blue (RGB) sensor), a medical sensor 240I, a temperature-humidity sensor 240J, an illuminance sensor 240K, and an ultraviolet sensor 240L. Additionally or alternatively, the sensor module 240 may, for example, include an E-nose sensor, an electromyography (EMG) sensor, an electroencephalogram (EEG) sensor, an electrocardiogram (ECG) sensor, an infrared (IR) sensor, an iris scan sensor, and/or a finger scan sensor.

The sensor module 240 may further include a control circuit to control at least one sensor included therein. According to an exemplary embodiment, the electronic apparatus 201 may further include a processor configured to control the sensor module 240 as part of the processor 210 or additionally, and control the sensor module 240 while the processor 210 is in a sleeping state.

The input apparatus 250 may, for example, include a touch panel 252, a digital pen sensor 254, a key 256, or an ultrasonic input apparatus 258.

The touch panel 252 may, for example, use at least one of electrostatic type, pressure sensitive type, infrared type, and a ultraviolet type. The touch panel 252 may further include a control circuit. The touch panel 252 may further include a tactile layer to provide a tactile response to a user.

The digital pen sensor 254 may, for example, be part of a touch panel or include an additional sheet for recognizing use.

The key 256 may, for example, include a physical button, an optical key, or a keypad.

The ultraviolet input apparatus 258 may detect ultrasonic created by an input tool through a microphone (e.g. microphone 288), and check data corresponding to the detected ultrasonic.

The display 260 (for example, display 160 shown in FIG. 1) may include a panel 262, a hologram apparatus 264 or a projector 266, and/or a control circuit to control them.

The panel 262 may, for example, be realized to be flexible, transparent or wearable. The panel 262 may be configured to include the touch panel 252 and one or more modules. According to an exemplary embodiment, the panel 262 may include a pressure sensor (or a force sensor) which may measure intensity of pressure with respect to a user touch. The pressure sensor may be realized to be integrated with the touch panel 252 or as one or more sensors separated from the touch panel 252.

The hologram apparatus 264 can display a stereoscopic image in the air using interference of light.

The projector 266 may project light onto a screen to display an image. The screen may, for example, be located within or outside the electronic apparatus 201.

The interface 270 may, for example, include a high-definition multimedia interface (HDMI) 272, a universal serial bus (USB) 274, an optical interface 276 or a D-sub-miniature (D-sub) 278. The interface 270 may, for example, be included in the communication interface 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may, for example, convert a sound into an electrical signal, and an electrical signal into a sound. At least some elements of the audio module 280 may, for example, be included in the input/output interface 150 illustrated in FIG. 1. The audio module 280 may process sound information input or output through a speaker 282, a receiver 284, earphones 286, or the microphone 288, etc. The receiver 284 may include the speaker 282.

The camera module 291 is, for example, an apparatus which captures a still image and a video, and according to an exemplary embodiment, include at least one image sensor (e.g. front sensor or rear sensor), a lens, an image signal processor (ISP), or a flash (e.g. LED or xenon lamp, etc.).

The power management module 295 may, for example, manage power of the electronic apparatus 201. According to an exemplary embodiment, the power management module 295 may include a power management integrated circuit (PMIC), a charger integrated circuit (IC), a battery gauge 296, or a fuel gauge. The PMIC may use a wired and/or wireless charging method. The wireless charging method may, for example, include a magnetic resonance method, an electromagnetic inductive method, an electromagnetic method, or etc., and further include, for example, a coil loop, a resonance circuit, a rectifier, or etc. The battery gauge may, for example, measure a residual amount of the battery 296, and a voltage, current, or temperature while charging. The battery 296 may, for example, include a rechargeable battery and/or a solar battery.

The indicator 297 may display a particular state, for example, a booting state, a messaging state, a charging state, or etc., of the electronic apparatus 201 or of part of the electronic apparatus 201 (e.g. processor 210).

The motor 298 may convert an electrical signal into a mechanical vibration, and create vibration, haptic effect, or etc. The electronic apparatus 201 may include, for example, a mobile TV support device (for example, GPU) for processing media data in accordance with a standard, such as a digital multimedia broadcasting (DMB), a digital video broadcasting (DVB), a media Flo™, etc.

The elements described in the present disclosure may respectively configured as one or more components, and the name of each element may vary depending on the type of an electronic apparatus. In various exemplary embodiments, an electronic apparatus (for example, the electronic apparatus 201) may be configured to include at least one of the elements described in the present disclosure, and omit some elements or further include another element. Also, some of the elements of an electronic apparatus according to various exemplary embodiments may be combined to be a single entity to perform the same function of the corresponding elements as the elements before combination.

Figure 3:
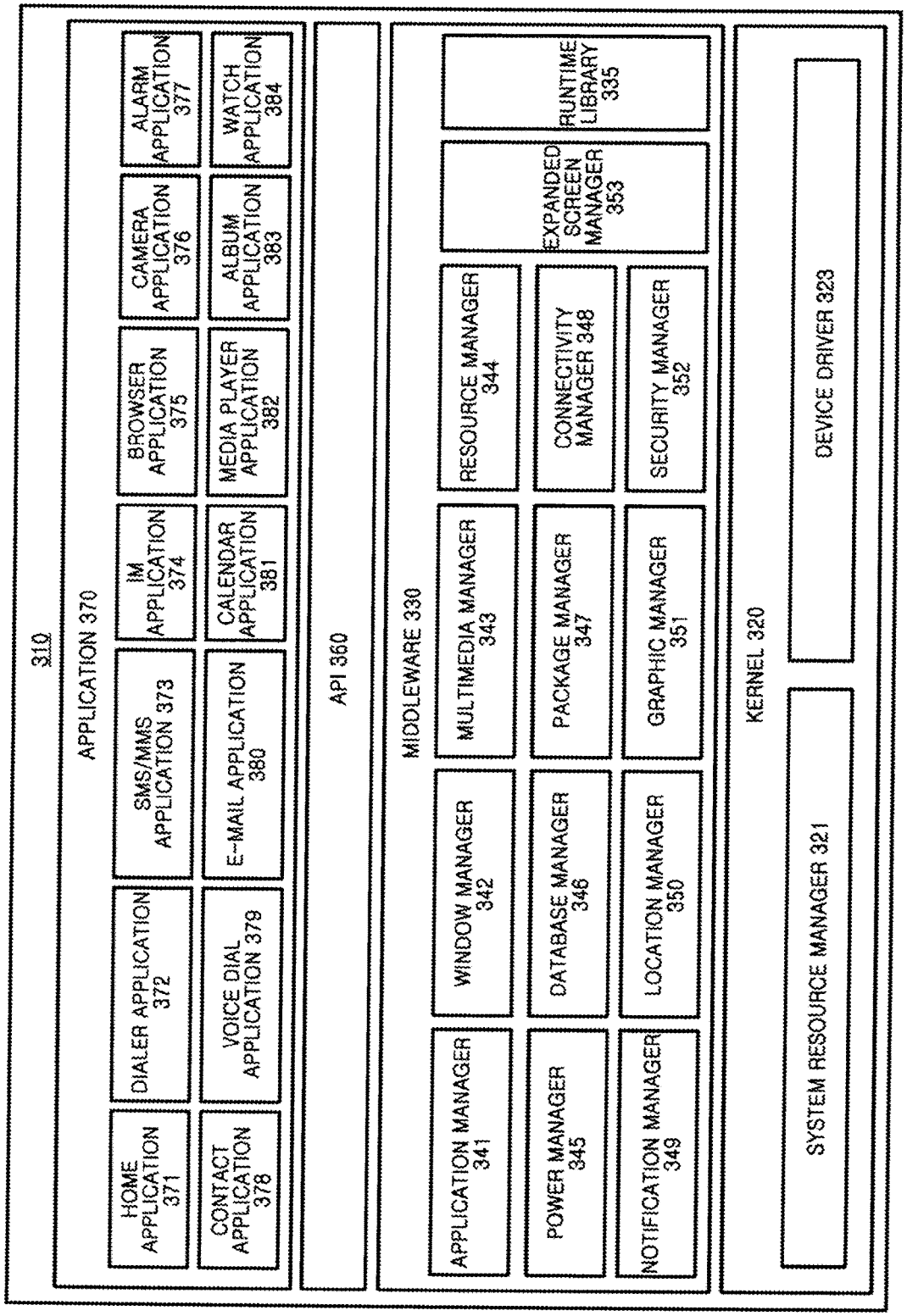
FIG. 3 is a block diagram of a program module according to various exemplary embodiments.

FIG. 3 is a block diagram of a program module according to various exemplary embodiments. According to an exemplary embodiment, the program module 310 (for example, the program 140 may include various operating systems and/or various applications (for example, application 147) operated on the operating systems controlling resources relating to the electronic apparatus (for example, the electronic apparatus 101). The operating system may include, for example, Android™, iOS™, Windows™, Symbian™, Tizen™, or Bada™. Referring to FIG. 3, the program module 310 may include kernel 320 (for example, kernel 141), middleware 330 (for example, middleware 143), API 360 (for example, API 145), and/or the application 370 (For example, application 147). At least a part of the program module 310 can be preloaded on an electronic apparatus or downloaded from an external electronic apparatus (for example, first and second external electronic apparatuses 102, 104, server 106).

The kernel 320 may include, for example, a system resource manager 321 and/or a device driver 323.

The system resource manager 321 may perform control, allocation, or collection of the system resource. According to an exemplary embodiment, the system resource manager 321 may include a process manager, a memory manager, or a file system manager.

The device driver 323 may include, for example, a display driver, a camera driver, a Bluetooth driver, a common memory driver, USB driver, a keypad driver, a WiFi driver, an audio driver, or inter-process communication (IPC) driver.

The middleware 330, for example, may provide various functions to the application 370 through the API 360 so that a function commonly required by the application 370 can be provided, or the application 370 can use limited system resources inside the electronic apparatus. According to an exemplary embodiment, the middleware 330 may include at least one of runtime library 335, an application manager 341, a Window manager 342, a multimedia manager 343, a resource manager 344, a power manager 345, a database manager 346, a package manager 347, a connectivity manager 348, a notification manager 349, a location manager 350, a graphic manager 351, a security manager 352, or an expanded screen manager 353.

The runtime library 335 may include, for example, library module used by a compiler to add a new function through programming language while the application 370 is being executed. The runtime library 335 may perform input/output management, memory management, or arithmetic function processing.

The application manager 341 may manage, for example, life cycle of the application 370.

The Window manager 342 may manage GUI resource used on a screen.

The multimedia manager 343 may perform encoding or decoding of a media file by identifying a format required for reproduction of media files and using codecs suitable for the corresponding format.

The resource manager 344 may manage a source code or memory space of the application 370.

The power manager 345, for example, may manage capacity or power of a battery and provide electricity information required for operating an electronic apparatus. According to an exemplary embodiment, the power manager 345 can be interworked with basic input/output system (BIOS).

The database manager 346, for example, may generate, search, or change database to be used in the application 370.

The package manager 347 may manage installation or update of an application which is distributed in a form of a package file.

The connectivity manager 348, for example, may manage wireless connection.

The notification manager 349, for example, may provide a user with events such as arrival message, promise, alarm, reminder, approach notification, etc.

The location manager 350, for example, may manage position information of an electronic apparatus.

The graphic manager 351, for example, may manage the graphic effect to be provided to a user or relevant user interface.

The security manager 352, for example, may provide system security or user authentication.

The enlarged screen manager 353, for example, may determine a display area where graphic is to be displayed. According to an exemplary embodiment, the enlarged screen manager 353 may manage information to be provided through a display area determined to display graphic, graphic effect or relevant user interface. According to an exemplary embodiment, the middleware 330 may include telephony manager for managing a voice or video call function of an electronic apparatus or a middleware module which can form a combination of the aforementioned elements. According to an exemplary embodiment, the middleware 330 may provide a module specialized for types of operating systems. The middleware 330 may partially delete the former elements or add new elements.

The API 360, for example, may be provided as a group of API programming functions as different configurations according to the operating system. For example, in case of Android™ or iOS™, one API set can be provided by platforms and in case of Tizen™, two or more API sets can be provided by platforms.

The application 370 may include, for example, home application 371, dialer application 372, SMS/MMS application 373, instant message (IM) application 374, browser application 375, camera application 376, alarm application 377, contact application 378, voice dial application 379, e-mail application 380, calendar application 381, media player 382 application, album application 383, watch application 384, and applications for providing health care (for example, measuring exercise amount or blood glucose, etc.) or environment information (for example, atmospheric pressure, humidity, or temperature information).

According to an exemplary embodiment, the application 370 may include information exchange application which can support information exchange between the electronic apparatus and the external electronic apparatus.

The information exchange application may include, for example, a notification relay application to deliver specific information to the external electronic apparatus, or the device management application for managing the external electronic apparatus. For example, the notification delivery application may deliver notification information generated from another application of the electronic apparatus to the external electronic apparatus, or receive notification information from the external electronic apparatus and provide the information to a user.

The apparatus management application may, for example, install, delete, or update functions (for example, turn-on/turn-off of the external electronic apparatus (or some elements) or adjustment of brightness (or resolution) of a display) of the external electronic apparatus communicating with an electronic apparatus or an application operating in an external electronic apparatus.

According to an exemplary embodiment, the application 370 may include a designated application (for example, health management application of a mobile medical device) according to attributes of an external electronic apparatus. According to an exemplary embodiment, the application 370 may include an application received from the external electronic apparatus.

At least a part of the program module 310 may be implemented as software, firmware, hardware (for example, the processor 210), or the combination of at least two, and may include a module, program, routine, a command set, or process for performing one or more functions.

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions. "Module" may be implemented either mechanically or electronically and may include, for example, application-specific integrated circuit (ASIC) chips, field-programmable gate arrays (FPGAs) Programmable logic devices. At least some of the devices (e.g., modules or functions thereof) or methods (e.g., operations) according to various exemplary embodiments may be stored in a computer-readable storage medium (e.g., memory 130). When the command is executed by a processor (e.g., the processor 120), the processor may perform a function corresponding to the command.

The computer-readable recording medium may be a hard disk, a floppy disk, a magnetic medium (for example, a magnetic tape), an optical recording medium (e.g., CD-ROM, DVD, magnetic-optical medium, a floppy disk), internal memory, etc. The command may include code generated by a compiler or code that may be executed by an interpreter. Operations performed by a module, a program module, or other component according to various exemplary embodiments, may be sequential, parallel, or both, executed iteratively or heuristically, or at least some operations may be performed in a different order, omitted, or other operations may be added.

Figure 4:
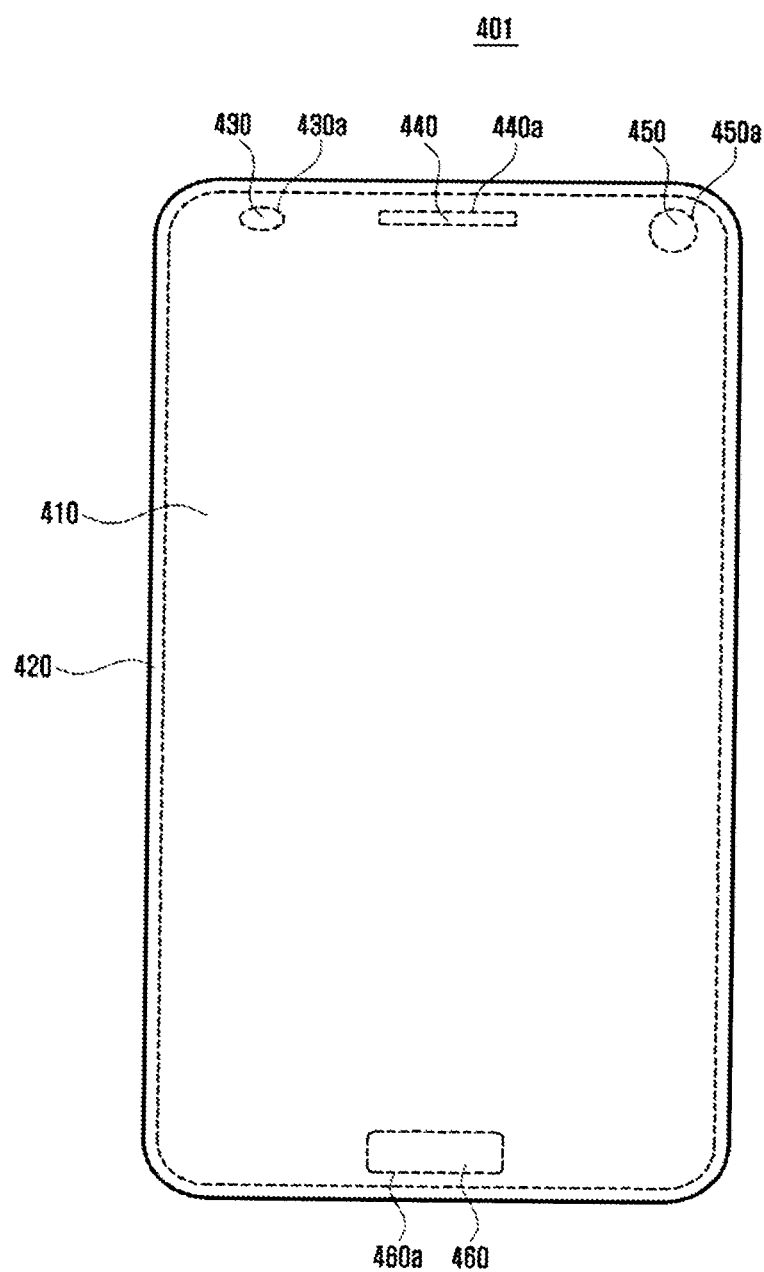
FIG. 4 is a front view according to various exemplar) embodiments.

Referring to FIG. 4, a front view of an electronic apparatus 401 is described in various exemplary embodiments. The electronic apparatus 401 may include the display 410, the housing 420, the optical sensor 430, the receiver 440, the camera 450 and the fingerprint sensor 460. According to an exemplary embodiment, the display 410 may be formed on the entire front surface of the electronic apparatus 401. Accordingly, the housing 420 may not be formed on the front surface of the electronic apparatus 401.

The display 410, for example, may be formed by being extended to a side of the electronic apparatus 401. In addition, according to an exemplary embodiment, the display 410 may be formed on a part of a front surface of the electronic apparatus 401. Accordingly, the housing 420 may be formed on a remaining part of a front surface of the electronic apparatus 401.

Figure 6:
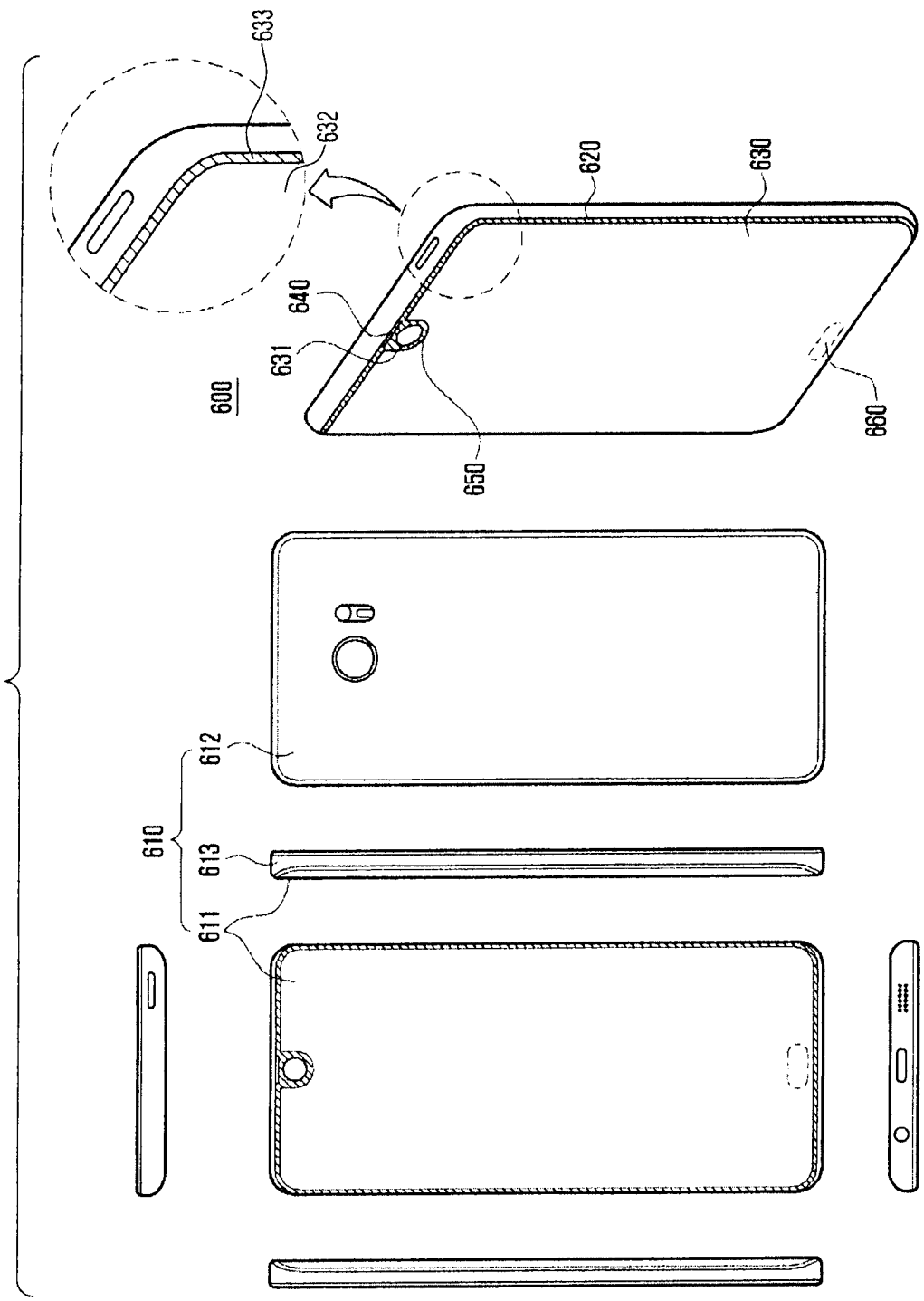
FIG. 6 is a perspective view and cubic diagram of the electronic apparatus according to an exemplary embodiment.

The display 410 may be protected by a cover glass 620 (see FIG. 6). According to an exemplary embodiment, the cover glass 620 may have a plurality of holes (or openings). For example, the cover glass 620 may include an optical sensor hole 430a, a receiver hole 440a, a camera hole 450a, and a fingerprint sensor hole (or a groove button hole 460a). The cover glass 620 may further include an LED hole 735 (see FIG. 7). Further, the cover glass 620 may further include an incision 631 (see FIG. 6).

According to various exemplary embodiments, the optical sensor 430, the receiver 440, the camera 450 and the fingerprint sensor 460, for example, may be connected to the housing 420 or the lower part of the display 410 (e.g., backside of the display 410). The optical sensor 430, the receiver 440, the camera 450 and the fingerprint sensor 460 may be included in the display 410, for example. The optical sensor 430 may include, for example, a proximity sensor, an illumination sensor, an iris sensor, or a UV sensor.

According to an exemplary embodiment, the optical sensor 430, the positions of the receiver 440, the camera 450, and the fingerprint sensor 460 are not limited to the positions illustrated in FIG. 4. For example, the optical sensor 430 can be located at a lower position of the electronic apparatus 401, instead of being located at the upper portion, as shown in FIG. 4.

Figure 5:
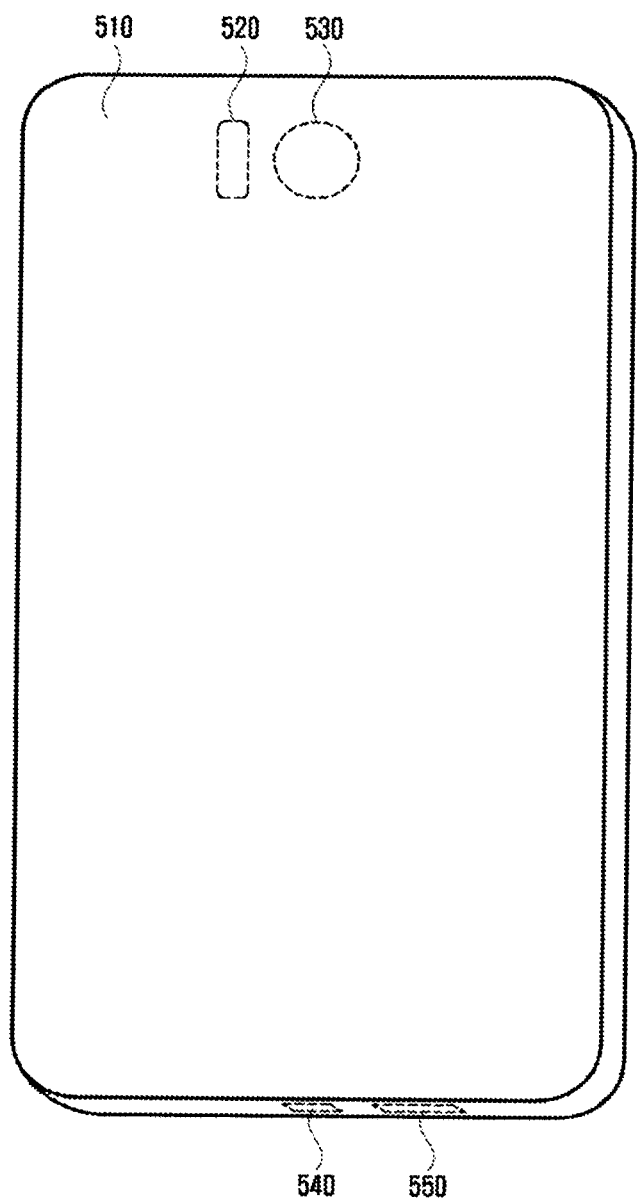
FIG. 5 is a back view according to various exemplary embodiments.

Referring to FIG. 5, in the various exemplary embodiments, a back surface and a side surface of an electronic apparatus 501 are disclosed. The electronic apparatus 501 may include a housing 510, a biosensor 520, a camera 530, interface 540, and a speaker 550.

According to an exemplary embodiment, the housing 510 can be formed at a back surface and a side surface of the electronic apparatus 501. According to an exemplary embodiment, the bio sensor 520 and the camera 530 may be positioned on a back surface of the electronic apparatus 501. According to an exemplary embodiment, the interface 540 and the speaker 550 may be positioned on a side surface of the electronic apparatus 501. According to an exemplary embodiment, positions of the bio sensor 520, camera 530, the interface 540, and the speaker 550 are not limited to the positions illustrated in FIG. 5.

FIG. 6 is a perspective view and a six-side view according to an exemplary embodiment. Referring to FIG. 6, the electronic apparatus 600 according to an exemplary embodiment may include a housing 610, a cover glass 620, a display panel 630, a receiver hole 640, a camera module 650, and a home button 660.

The housing 610 may include a first side 611 disposed toward a first direction (front surface), a second side 612 disposed toward a second direction (back surface) opposite to the first direction, and a side surface 613 surrounding space between the first surface 611 and the second surface 612.

The cover glass 620 can protect the configuration such as the display panel 630 of the electronic apparatus 600 and the like. The cover glass 620 may correspond to at least the front surface of the electronic apparatus 600. For example, the cover glass 620 may occupy the entire front surface. The cover glass 620 may occupy a portion of the front surface and the side surface. The cover glass 620 may be a flat surface, or may have a curved surface whose upper, lower, left and/or right ends are curved. The cover glass 620 may be made of a transparent material. The cover glass 120 may be made of a material such as, for example, tempered glass, plastic (e.g., PET) or aluminum oxide.

The display panel 630 can be disposed below the cover glass 620. The display panel 630 can be curved so that a left end, a right end, an upper end and/or lower end are curved, and disposed inside the housing 610.

The display panel 630 can be a full front display which occupies most of a front surface of the electronic apparatus. By the expansion of the display panel 630, disposition of other configurations can be changed. For example, configurations such as the camera module 650 and the receiver (not shown) can be disposed at an outermost part of the electronic apparatus 600.

The display panel 630 may include an active area 632 and an inactive area 633. The active area 632 can be exposed through a transparent area of the cover glass 620. The active area 632 may output light according to an electrical signal provided through scan line and data line. The aspect ratio of the active area 632 can be, for example, 18.5:9. In addition, the aspect ratio of the active area 632 may include 4:3, 3:2, 8:5, 16:10, 5:3, or 21:9.

According to an exemplar) embodiment, the active area 632 may occupy at least a part of a front surface or a side surface. For example, the active area 632 can be disposed in a shape to cover a front surface and a side surface. The active area 632 of the electronic apparatus according to an exemplary embodiment can be closer to a normal active area.

The side surface of the active area 632 can have a function as a soft key to control volume. A position of a soft key can be changed based on a grip state or use history of a user. The active area 632 may occupy most of the front surface (for example, 90% or more of the size of the front surface).

The inactive area 633 can be an area which surrounds the active area 632. The inactive area 633 of the electronic apparatus 600 according to an exemplary embodiment can be formed to be narrow compared to the inactive area 633 of an ordinary electronic apparatus 600. At least a part of the inactive area 633 can be exposed through a cover glass 620.

The inactive area 633 can be, for example, an area hidden by an opaque masking layer which is a peripheral area of the display panel 630. The opaque masking layer can be formed by printing a layer on the cover glass 620. A ratio of thickness of horizontal inactive area 633 and the vertical inactive area 633 can be, for example, 1:1, 2:1 or 3:1. As another example, the thickness ratio of the inactive area 633 in an upper end, the inactive area 633 in a side end, and the inactive area 633 in a lower end can be 2:1:4, for example.

The display panel 630 may include one or more openings or one or more incisions (e.g., slits, slots, wide openings, etc.). For example, the display panel 630 may include at least one opening 631 formed on an upper end of the active area 632. The display panel 630 can be curved so that the opening 631 is positioned on a corner and can be disposed inside the housing 610.

As illustrated in FIG. 6, when seeing from a front surface of the electronic apparatus 600, the opening 631 can form a U-shaped space. Through a space formed by the opening 631, various modules of the electronic apparatus 600 can be exposed.

The touch screen display can include a module including a touch screen, cover glass and/or a polarizing plate along with the display panel 130.

The camera module 650 may be disposed at a position corresponding to one or more openings or one or more incisions. For example, the camera module 650 may be disposed in a space formed by one or more openings or one or more incisions. For example, the camera module 650 may be disposed in a space formed by an opening 631 formed at the top of the active area 632. The camera module 650 may be exposed to the outside through the cover glass 620. For example, the camera module 650 may be visible through the cover glass 620 while being disposed under the cover glass 620. The camera module 650 can acquire an image by sensing light incident from the outside through the cover glass 620.

According to an exemplary embodiment, the camera module 650 can be disposed so as to be exposed through the upper center of the cover glass 620.

According to an exemplary embodiment, the camera module 650 can be disposed to be close to the outermost part of the front surface as much as possible.

The receiver hole 640 may deliver sound generated by a receiver 440 disposed inside the housing 610 to an outside. The receiver hole 640 may be formed on a front surface 611 of the housing 610. For example, the receiver hole 640 may be formed on a metal frame on the side surface 613.

The front surface 611 of the housing may have a certain curvature and may be formed of a side surface and a metal frame. As shown in FIG. 4, the electronic apparatus 600 may include more than one receiver hole 640. The receiver hole 640 is formed on the side surface 613 so that the sound generated by the receiver 440 can be transmitted to the outside without affecting the display panel 630 occupying the front surface 611 of the electronic apparatus 100. In FIG. 6, it is shown that a receiver hole 640 is formed on the front surface 611 of the housing 610, but the present invention is not limited thereto. A receiver hole may be formed on the side surface 613 of the housing 610.

The home button 660 can be disposed at a front lower end of the electronic apparatus 600. The home button 660 can be a physical key or a soft key. When the home button 660 is a physical key, the display panel 630 may include an opening (for example, an opening in an upper end) formed at a lower end of the active area 632 or an incision to dispose the home button 660.

The home button 660 may be embodied as a soft key at a lower end of the front surface 611 of the electronic apparatus 600. When the home button 660 is a soft key, a fingerprint sensor can be disposed below the area of the button 660 from among the display panel 630. The cover glass 620 may include a recessed part formed on a position where a fingerprint sensor is disposed.

As described above, the electronic apparatus 600 according to an exemplary embodiment may include the display panel 630 which is exposed through the front surface 611 of the electronic apparatus 600 and the camera module 650 disposed inside the display panel 630.

Figure 7:
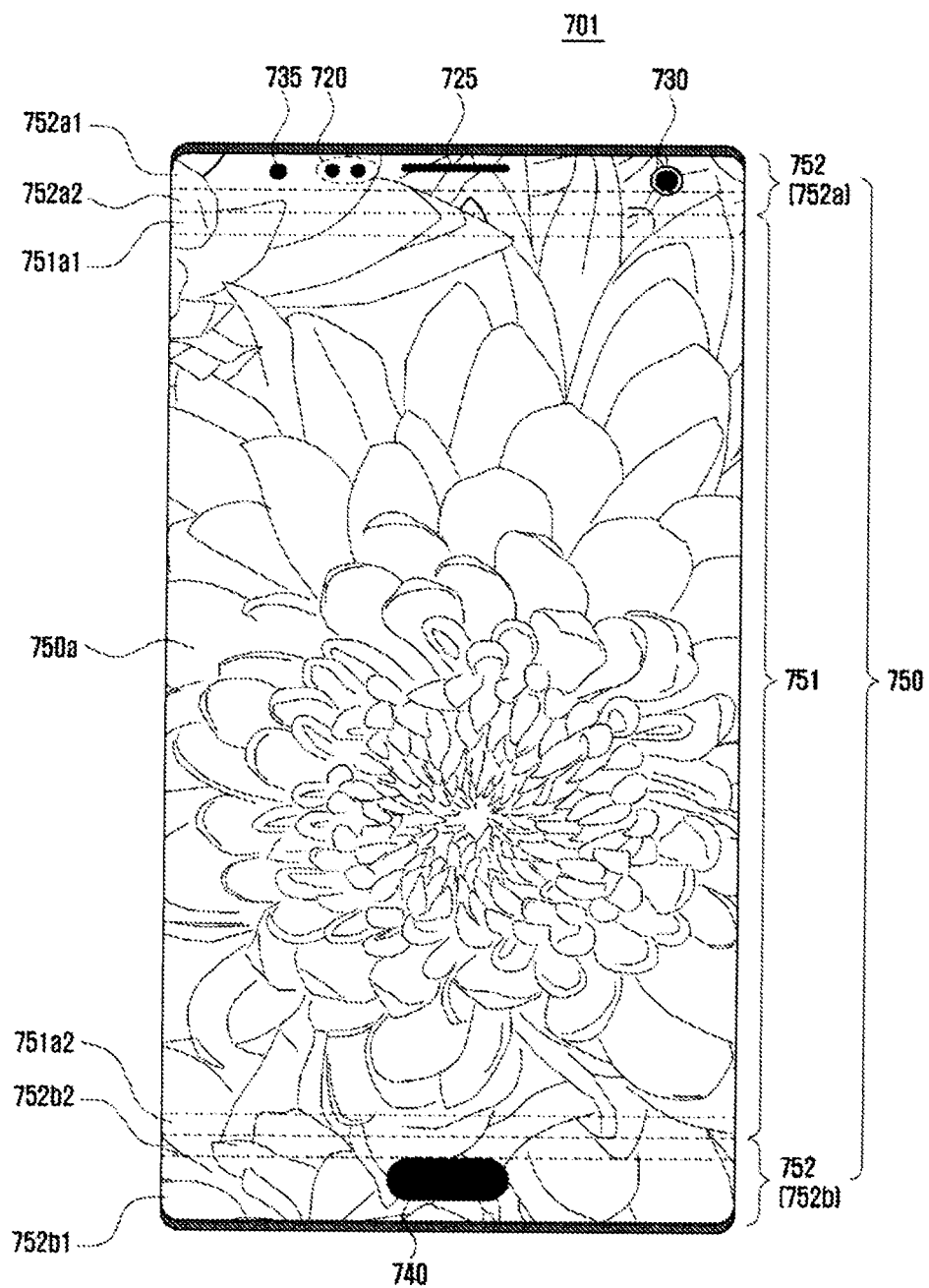
FIG. 7 is a front view of the electronic apparatus according to an exemplary embodiment.

FIG. 7 is a front view of an electronic apparatus according to an exemplary embodiment.

Referring to FIG. 7, a front view of an electronic apparatus 701 according to an exemplary embodiment is described. Content (e.g., image 750*a*) is displayed on a display 750 of the electronic apparatus 701. Display 750 may include an edge display that extends to one side (or both sides). For example, the housing 610 may be visible at the top and/or bottom of the display 750 at the front of the electronic apparatus 701. The housing 610 may be visible to the left and/or right of the display 750 at the front of the electronic apparatus 701. According to various exemplary embodiments, the housing 610 may not be visible to the left and/or right of the display 750 at the front of the electronic apparatus 701.

The display 750 includes the main area 751 and the enlarged area 752. The enlarged area 752 may include the first enlarged area 752*a* which extends from an upper end of the main area 751 and the second enlarged area 752*b* which extends from a lower end of the main area 751.

One or a plurality of hole areas (at least one of an optical sensor hole 720, a receiver hole 725, a camera hole 730, and a LED hole 735) can be disposed in the first enlarged area 752*a*. According to various exemplary embodiments, one or more of the home button or fingerprint sensor hole 740 can be disposed on the second enlarged area 752*b*.

A size of the main area 751 may be greater than a size of the enlarged area 752. A size of the first enlarged area 752*a* can be equal to or different from a size of the second enlarged area 752*b*. For example, a size of the second enlarged area 752*b* can be greater than a size of the first enlarged area 752*a*.

The display 750 may include the main area 751 and the first enlarged area 752*a*. The display 750 may include the main area 751 and the second enlarged area 752*b*. In addition, the display 750 may include all of the main area 751, the first enlarged area 752*a*, and the second enlarged area 752*b*.

The main area 751 may include a first area 751*a*1 which is disposed at an upper end of the main area 751 and is adjacent to the first enlarged area 752*a*. In addition, the main area 751 may include a second area 751*a*2 which is disposed at a lower end of the main area 751 and adjacent to the second enlarged area 752*b* at a lower end. A size of the first area 751*a*1 can be equal to or different from a size of the second area 751*a*2.

According to various exemplary embodiments, the first area 751*a*1 and/or the second area 751*a*2 may be an edge area of the main area 751. The first area 751*a*1 and/or the second area 751*a*2 may correspond to an edge area of one side of an image (or content).

According to various exemplary embodiments, a size of the main area 751 of the display 750 can be, for example, 1440×2560 pixels. A size of the first enlarged area 752*a* can be 1440×216 pixels. A size of the second enlarged area 752*b* can be 1440×216 pixels. A size of the first area 751*a*1 can be 1440×10 pixels. In addition, a size of the second area 751*a*2 can be 1440×10 pixels.

The aforementioned size of the main area 751, the first enlarged area 752*a*, the second enlarged area 752*b*, and the first area 751*a*1 and/or a size of the second area 751*a*2 is an example, and can change respectively in response to the aspect ratio of the display 750. This could have been easily understood to those skilled in the art.

Analysis of the first area 751*a*1 or analysis of the second area 751*a*2 can mean analysis of an edge area disposed on one side of an image (or a content).

The processor 210 may analyze the first area 751*a*1, enlarge the content 750*a* displayed on the main area 751 to be enlarged up to the first enlarged area 752*a*. The processor 210 may analyze the second area 751*a*2, enlarge the content 750*a* displayed on the main area 751 up to the second enlarged area 752*b* and display the same.

The processor 210 may analyze the first area 751*a*1 and/or the second area 751*a*2, enlarge the content 750*a* displayed on the main area 751 up to the first enlarged area 752*a* and/or the second enlarged area 752*b* and display the same.

The first enlarged area 752*a* can be divided into an eleventh enlarged area 752*a*1 and a twelfth enlarged area 752*a*2. The size of the eleventh enlarged area 752*a*1 may be different from that of the twelfth enlarged area 752*a*2. The size of the eleventh enlarged area 752*a*1 may be determined by the position of the camera (or camera hole 730). If the center (or optic axis) of the camera (or camera hole 730) is located below (for example, nearby the main area) the center point (for example, central pixel from among pixels corresponding to length of the first enlarged area) of the first enlarged area 752*a*, the size of the eleventh enlarged area 752*a*1 may be different from that of the twelfth enlarged area 752*a*2.

The second enlarged area 752*b* can be divided into a twenty-first enlarged area 752*b*1 and a twenty-second enlarged area 752*b*2. The size of the twenty-first enlarged area 752*b*1 may be different from that of the 22nd enlarged area 752*b*2. The size of the twenty-first enlarged area 752*b*1 may be determined by the position of the fingerprint sensor (or the home button or fingerprint sensor hole 740). The home button or fingerprint sensor hole 740 is positioned above (e.g., close to the main area) than the center point of the second enlarged area 752*b* (e.g., the middle pixel position of the pixels corresponding to the longitudinal part of the second enlarged area). The size of the twenty-first enlarged area 752*b*1 may be different from that of the twenty-second enlarged area 752*b*2.

The processor 210 may analyze the first area 751*a*1, enlarge the content 750*a* displayed on the main area 751 up to the twelfth enlarged area 752*a*2 and display the same. In addition, the processor 210 may analyze the second area 751*a*2, enlarge the content 750*a* displayed on the main area 751 up to the twenty second enlarged area 752*b*2.

The content 750*a* may be displayed in the main area 751 of the display 750 by the processor 210. The content 750*a* displayed in the main area 751 may be enlarged by the processor 210 to the main area 751 and the first enlarged area 752*a* of the display 750. The content 750*a* displayed in the main area 751 may be enlarged by the processor 210 to the main area 751 and the second enlarged area 752*b* of the display 750. The content 750*a* displayed in the main area 751 may be enlarged by the processor 210 into the main area 751, the first enlarged area 752*a* and the second enlarged area 752*b* of the display 750.

The content 750*a* displayed on the main area 751 may be enlarged by the processor 210 to the main area 751, the first enlarged area 752*a*, and the twenty second enlarged area 752*b*2 of the display 750. In addition, the content 750*a* displayed on the main area 751 may be enlarged by the processor 210 to the main area 751, the twelfth enlarged area 752*a*2, and the twenty second enlarged area 752*b*2 of the display 750.

In one exemplary embodiment, a hole, an opening, or an incision on the front surface can be referred to as a hole area. In one exemplary embodiment, holes, openings, or incisions of a side (e.g., a volume button or a power button, etc.) may be referred to as a hole area. In one exemplary embodiment, holes, openings, or incisions in the back (e.g., camera, flash, etc.) can be referred to as hole areas.

The electronic apparatus according to an exemplary embodiment is an electronic apparatus including: a housing including a first surface facing a first direction and a second surface facing a second direction facing the first direction; a touch screen display disposed between the first surface and the second surface and exposed through the first surface, the touch screen display having a main area and an enlarged area, a hole area located in the enlarged area, at least one processor electrically connected to the display, a memory electrically connected to the memory card; wherein the memory stores at least one instruction executed by the processor upon execution of the function, the processor analyzes the edge region of the selected content, based on the analysis result, enlarged by one of the interference enlargement and/or non-interference enlargement and displayed on the display.

In an exemplary embodiment, in case of interference enlargement, the processor can control the content to be displayed in the main area and the enlarged area and the content can be controlled to be limited in enlargement by the hole area.

In an exemplary embodiment, in case of non-interference enlargement, the processor can control the content to be displayed on the main area and a partial area of the enlarged area.

In an exemplary embodiment, the hole area may include one of a hole, an opening, and an incision.

Figure 8:
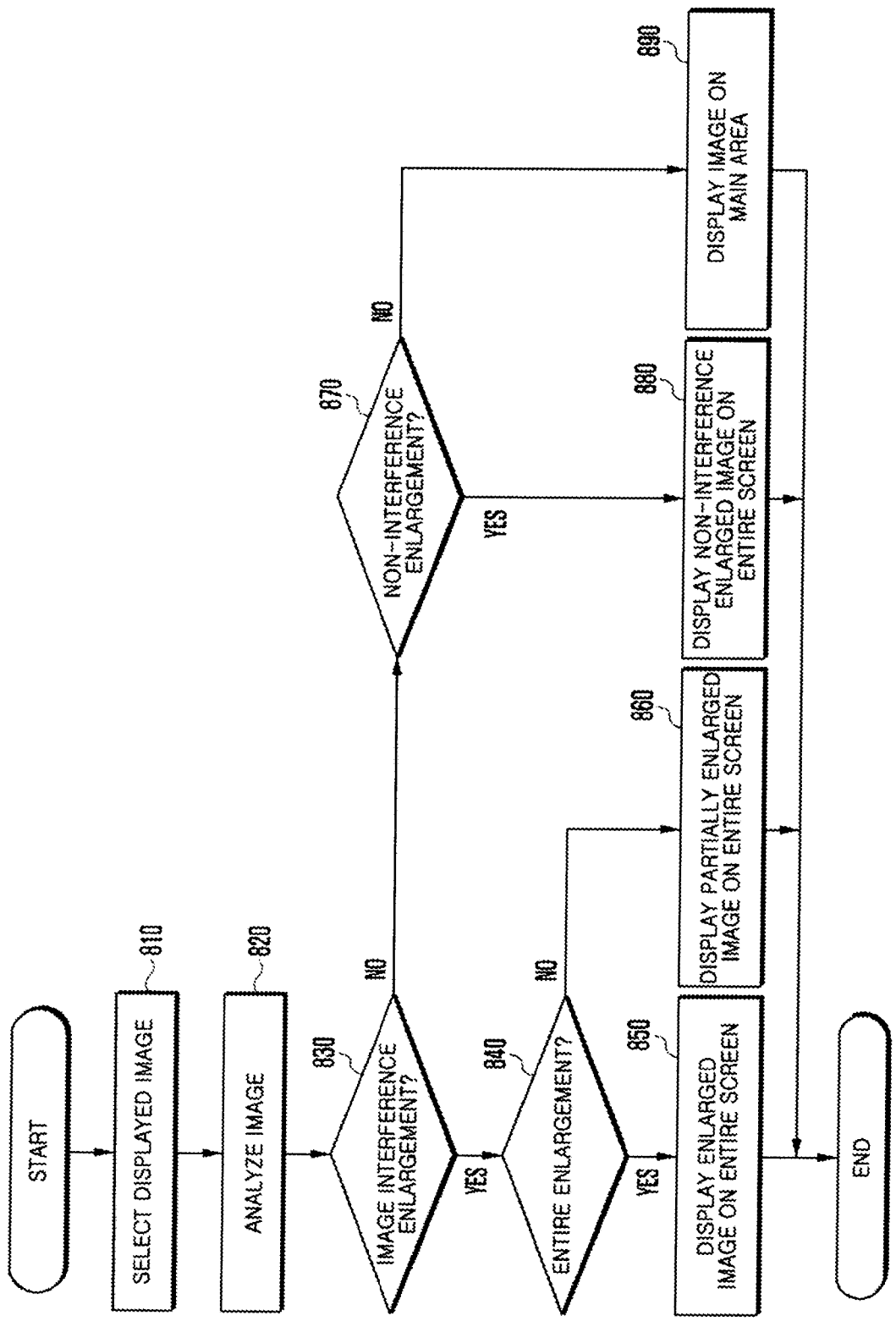
FIG. 8 is a flowchart indicating a method for controlling the electronic apparatus according to an exemplary embodiment.

FIG. 8 is a flowchart illustrating a method for controlling an electronic apparatus according to an exemplary embodiment.

FIGS. 9A to 9K are views illustrating an example of a method for controlling an electronic apparatus according to an exemplary embodiment.

In Operation 810 of FIG. 8, the electronic apparatus may select an image displayed by a user input.

Figure 9A:
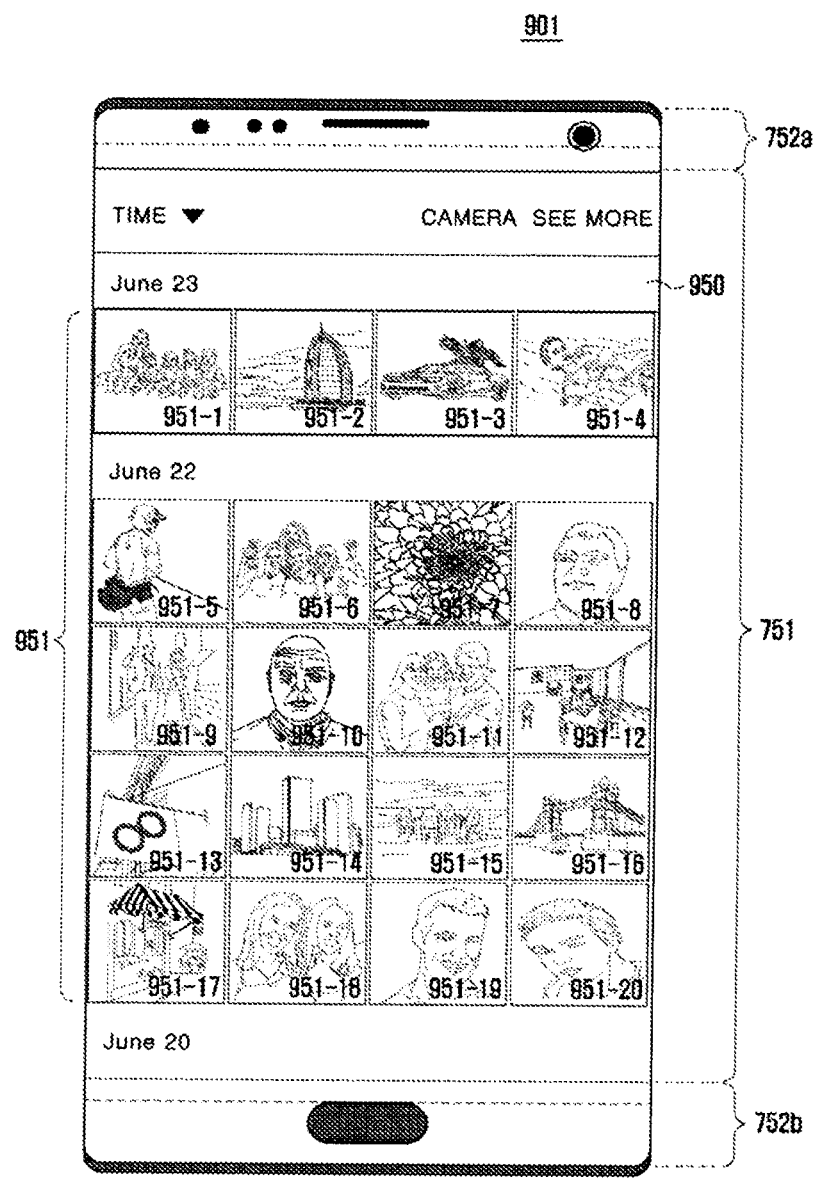
FIGS. 9A to 9K are views illustrating examples of a method for controlling an electronic apparatus according to an exemplary embodiment.

Referring to FIG. 9A, an image (or a thumbnail corresponding to an image 951) is displayed on a display 950 of the electronic apparatus 901. An image (or a shortcut corresponding to an image, not shown) is displayed on the display 950 of the electronic apparatus 901. In accordance with various exemplary embodiments, one or more images (or thumbnails 951-1 through 951-19 corresponding to images) are displayed on the display 950 of the electronic apparatus 901 via an application (e.g., photo application).

The aforementioned application (e.g., a photo application) is an example, and an application which can display an image (e.g., web browser, etc.) would also be applicable. The aforementioned application may include a video player displaying an image or a video.

The display 950 of the electronic apparatus 901 according to an exemplary embodiment may display an application screen including an image (or video), home screen or a lock screen.

Figure 9B:
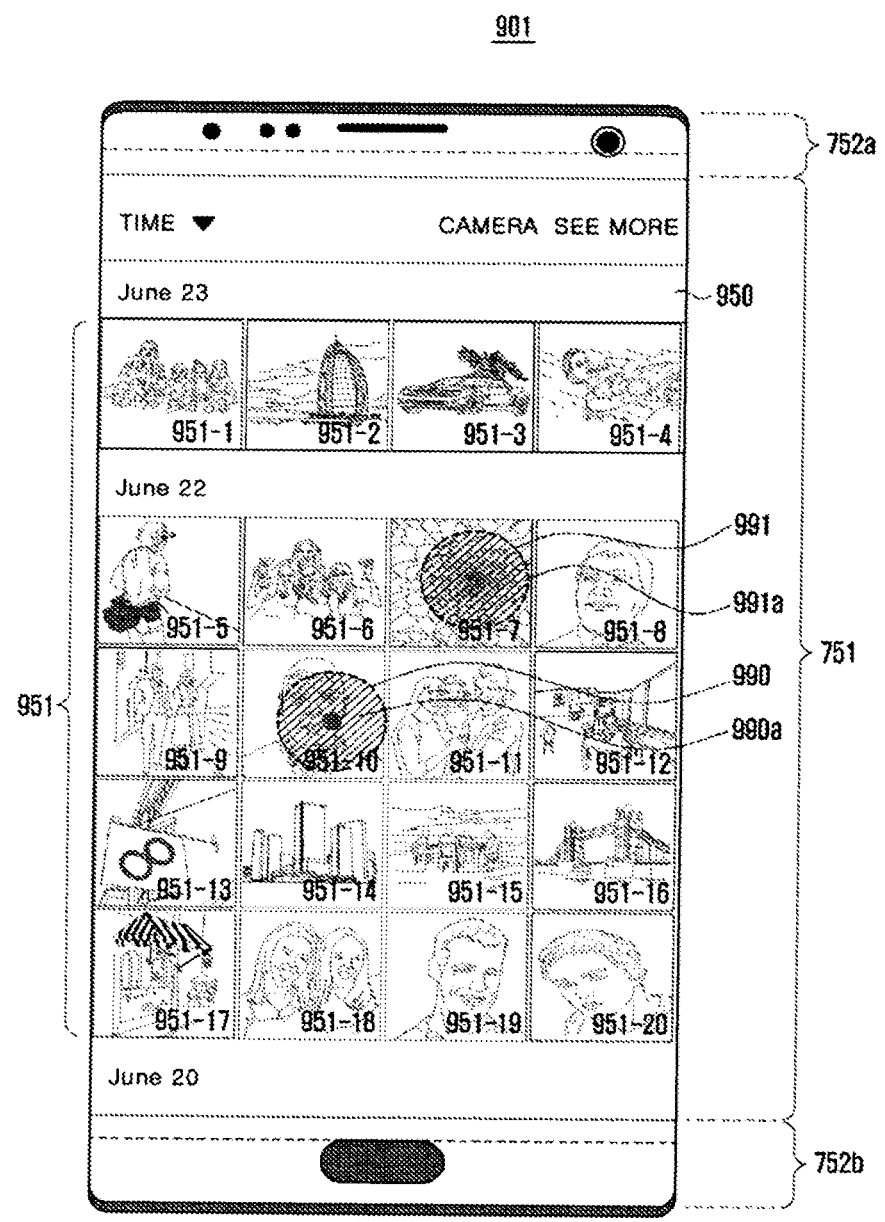

Referring to FIG. 9B, a first user input 990 (e.g., a touch input or a hovering input provided by hovering a finger or an input device over the display 950) is received at one image 951-10.

The processor 210 may detect a first user input 990 using a panel 262. The processor 210, by using an electric signal received from the panel 262, may calculate a first user input location 990*a* (e.g., X1 coordinate and Y1 coordinate) corresponding to the first user input 990.

According to various exemplary embodiments, the processor 210 may store in the memory 230 the first user input location 990*a*, touch detection time (e.g., 11:15 am) of the detected touch and touch information corresponding to the touch.

According to an exemplary embodiment, a second user input 991 (e.g., touch input or hovering input) can be received at another image 951-7.

The processor 210 may detect the second user input 991 using the panel 262. The processor 210, by using an electrical signal received from the panel 262, may calculate the second user input position 991*a* (e.g., X1 coordinate and Y1 coordinate) corresponding to the second user input 991.

The processor 210 may store the second user input position 991*a*, touch detection time (e.g., 11:15 a.m.) and touch information corresponding to the touch in the memory 230.

The first user input 990 and/or the second user input 991 in contact with the display 950 can be generated by one of the fingers including thumb, or an input device such as a touch input pen or stylus.

The processor 210 may analyze the image 951-7 corresponding to the second user input 990 and display it on the display 950. In one exemplary embodiment, the image may be meant to include images 951-10, 951-7. In one exemplary embodiment, the image may be meaningful including images 951-1 through 951-20. Further, in one exemplary embodiment, the image may be meant to include an image (previously stored in an electronic apparatus or downloadable).

An image is analyzed in Operation 820 of FIG. 8.

Figure 9C:
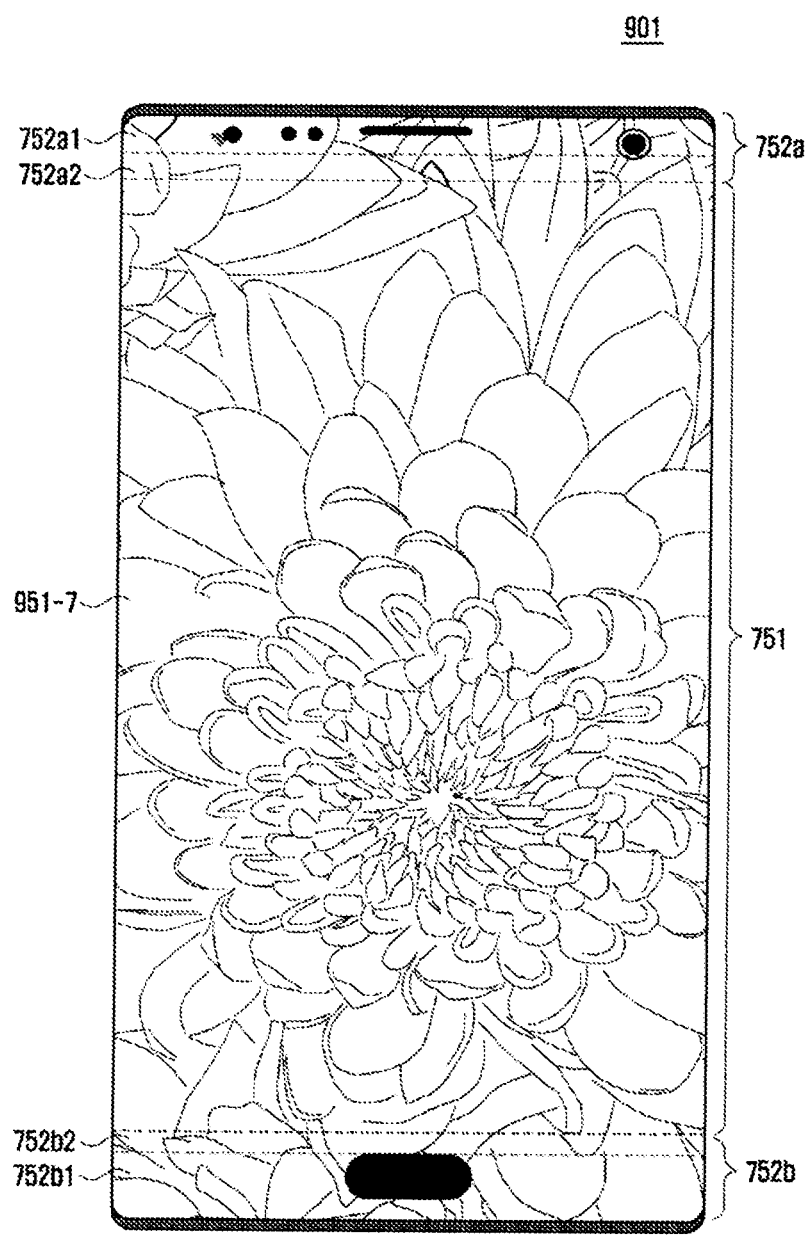

Referring to FIGS. 9B and 9C, the processor 210 analyzes an image 951-10 or 951-7 corresponding to a selected thumbnail. The processor 210 may analyze the first area 751a1 of the image corresponding to the selected thumbnail. The processor 210 may analyze pixels (e.g., 1440×10 pixels) included in the first area 751a1. The processor 210 may also include a portion of the pixels (e.g., 1440×10 pixels) included in the first region 751a1 (e.g., 1, 3, 5, 7, 9 pixels, 2, 5, 8 pixels or random pixels, etc.).

The processor 210 can analyze the color of each adjacent pixel. The processor 210 can analyze the chroma of each adjacent pixel. According to various exemplary embodiments, the processor 210 may analyze the texture of each adjacent pixel. The processor 210 can analyze the color, saturation, or texture values of each pixel. Since the algorithm corresponding to the above-described pixel analysis is a well-known technique, the redundant description can be omitted.

When difference of color, chroma, or texture of each pixel is less than a threshold value (e.g., 30% or some other value), the processor 210 may determine enlargement to the first enlarged area 752a. Or, if difference of color, chroma, or texture of each pixel is more than a threshold value (e.g., 30% or some other value), the processor 210 may determine that enlargement to the first enlarged area 752a is not possible.

The processor 210 may determine enlargement (e.g., enlargement of background color) of the first enlarged area 752a through analysis of the first area 751a1.

The processor 210 may analyze the second area 751a2 of an image corresponding to the selected thumbnail. The processor 210 may analyze a pixel (e.g., 1440×10 pixel) included in the second area 751a2.

Analysis of the second area 751a2 through the processor 210 is substantially similar to analysis of the first area 751a1 and thus, repetitive explanation will be omitted.

The processor 210 may analyze values of color, saturation, or texture of each pixel included in the second area 751a2. If the difference in hue, saturation, or texture of each pixel is below a threshold (e.g., 30% or some other value), the processor 210 may determine the enlargement of the image into the second enlarged area 752b. Also, if the difference in hue, saturation, or texture of each pixel is above a threshold (e.g., 30% or some other value), the processor 210 may determine that the image cannot be zoomed into the second enlarged area 752b.

The processor 210 may determine that the second enlarged area 752b of the image cannot be enlarged through analysis (e.g., exceeding the threshold) of the second area 751a2. In this case, the processor 210 may further determine enlargement of the twenty-second area 752b2 of the image. For example, if the difference in hue, saturation, or texture of each pixel in the second region 751a2 is less than 50%, then the processor 210 may determine the enlargement to the twenty-second region 752b2 of the image.

The processor 210 may analyze the first area 751a1 and the second area 751a2 sequentially or reversely.

In Operation 830 of FIG. 8, interference enlargement of an image is determined.

The processor 210 may determine interference enlargement of an image. The processor 210, according to an analysis result (e.g., less than a threshold value), may determine enlargement to at least one of the first enlarged area 752a and the second enlarged area 752b.

In one exemplary embodiment, enlargement of the image may include image interference enlargement and image non-interference enlargement. Image interference enlargement may be detected by analyzing the first area 751a1 through the first enlarged area 752a and the second enlarged area 752a through analysis (e.g., below the threshold) or analysis (e.g., below the threshold) of the second enlarged area 752b. The enlargement of the image may include an extension of the image.

The image interference enlargement may cause image enlargement limitation (or, in some areas (or hole areas)) in the image enlargement limitation (for example, in some areas, image display is restricted). In addition, the image interference enlargement may be caused by interference of image enlargement by a component (e.g., sensor, receiver, camera, home button, or fingerprint sensor, etc.) corresponding to a hole, (Or image display restriction) in the region.

The image non-interference enlargement may mean non-interference of image enlargement by holes, openings or incisions on the front side (for example, enlargement to the vicinity of the hole, opening or incision part on the front side). In addition, image interference enhancement may mean non-interference with image enlargement by components (e.g., sensors, receivers, cameras, home buttons, or fingerprint sensors, etc.) corresponding to holes.

Non-interference enlargement of an image may indicate enlargement to at least one of the twelfth area 752a2 and the twenty second enlargement area 752b2 through analysis of the corresponding first area 751a1 (e.g., exceeding a threshold value) or the second area 751a2 (e.g., exceeding a threshold value).

If both the first area 751a1 and the second area 751a2 are below the threshold value according to the analysis result, the processor 210 can determine the image interference enlargement. If one of the first area 751a1 and the second area 751a2 is below the threshold according to the analysis result, the processor 210 can determine the image interference enlargement. In addition, if both the first area 751a1 and the second area 751a2 are above the threshold according to the analysis result, the processor 210 can determine the image non-interference enlargement.

According to the determination of interference enlargement of an image, the processor 210 may enlarge an image to at least one of the main area 751 and the first enlarged area 752a, the main area 751 and the second enlarged area 752b, and the main area 751, the first enlarged area 752a, and the second enlarged area 752b.

In Operation 830 of FIG. 8, in case of interference enlargement of an image, Operation 840 of FIG. 8 is applied. In Operation 830 of FIG. 8, if it is not interference enlargement of an image (e.g., non-interference enlargement of an image), Operation 870 of FIG. 8 will be applied.

In Operation 840 of FIG. 8, entire enlargement of an image is determined.

When interference enlargement of an image is determined, the processor 210 may determine one of the entire enlargement of partial enlargement. If interference enlargement of an image is determined, the processor 210 may determine entire enlargement of an image or partial enlargement according to an analysis result.

The entire enlargement of an image may indicate enlargement of an image to an entire area of a display (including the main area 751, the first enlarged area 752a, and the second enlarged area 752b). In addition, an entire area of the display may be referred to as an interference area of a display.

Partial enlargement of an image may indicate enlargement to a partial area of a display (the main area 751 and the first enlarged area 752a or, the first enlarged area 752a and the second enlarged area 752b). In addition, a partial area of a display can be referred to as a non-interference area of a display.

In 840 of FIG. 8, in case of entire enlargement, Operation 850 of FIG. 8 is applied. In Operation 840 of FIG. 8, if it is not entire enlargement of an image (e.g., partial enlargement of an image), Operation 860 of FIG. 8 is applied.

In Operation 850 of FIG. 8, an enlarged image is displayed on an entire screen.

Referring to FIG. 9C, the processor 210 may enlarge an image (for example, 951-7) and display it on the entire screen. The processor 210 can enlarge and display the image 951-7 on the entire screen according to the analysis result. The entire screen is an area including the main area 751, the first enlarged area 752a, and the second enlarged area 752b. The entire screen size can be 1440×2992 pixels.

A size of an entire screen can change according to a size of a screen of the electronic apparatus 701 and/or the aspect ratio.

In an exemplary embodiment, not only an image but also an application screen can be displayed on an entire screen.

Figure 9D:
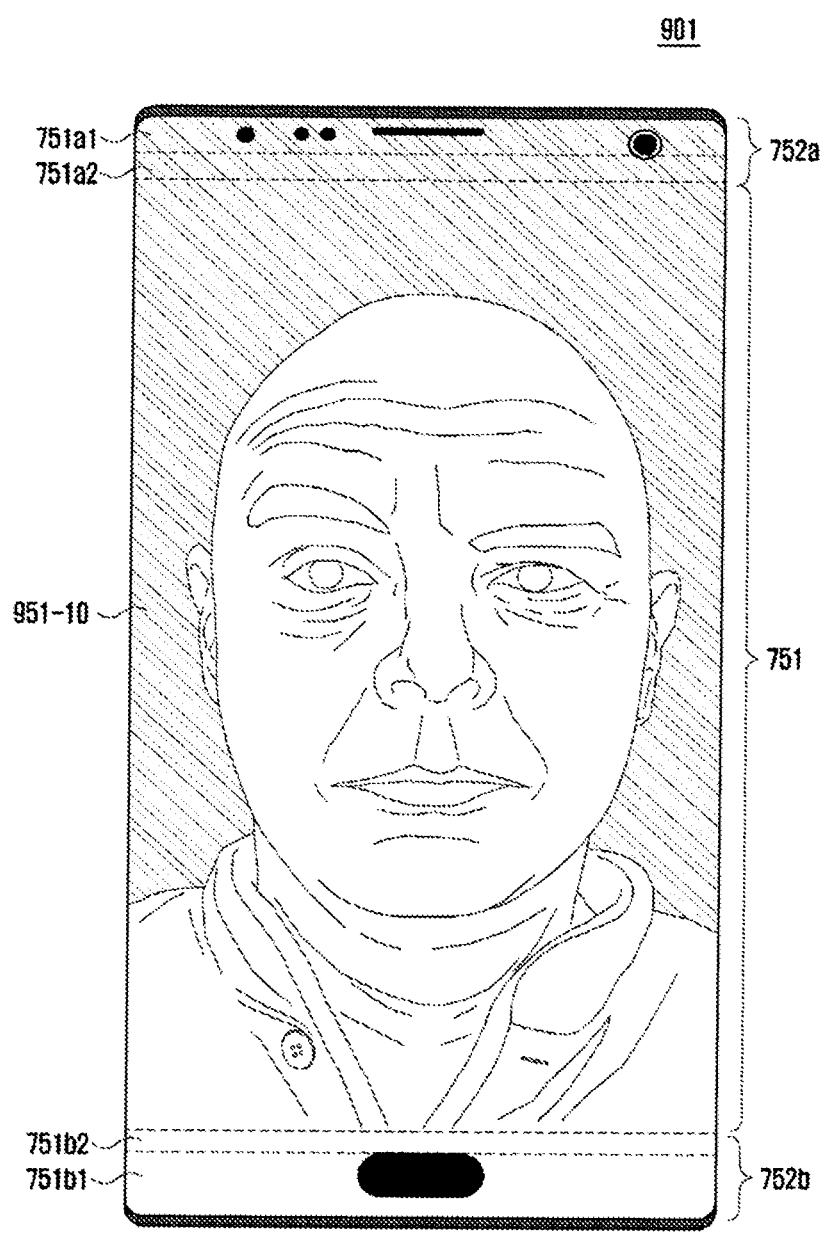
Figure 9E:
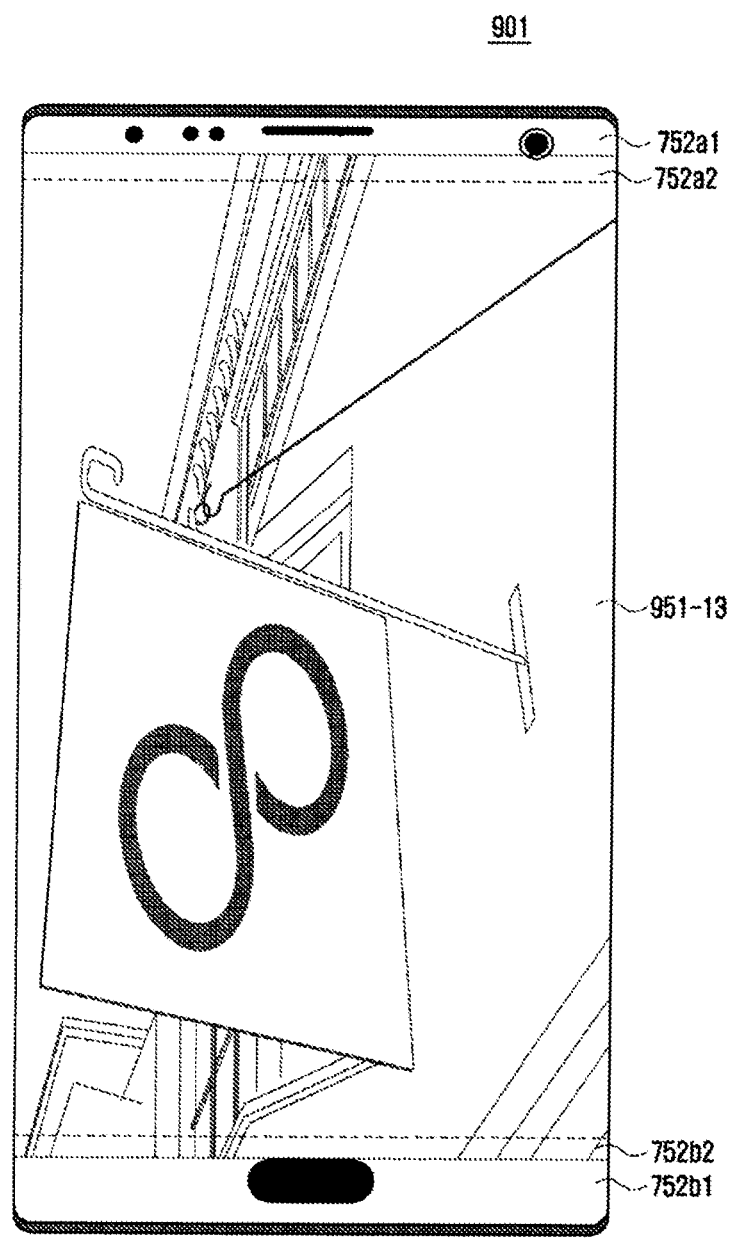
Figure 9F:
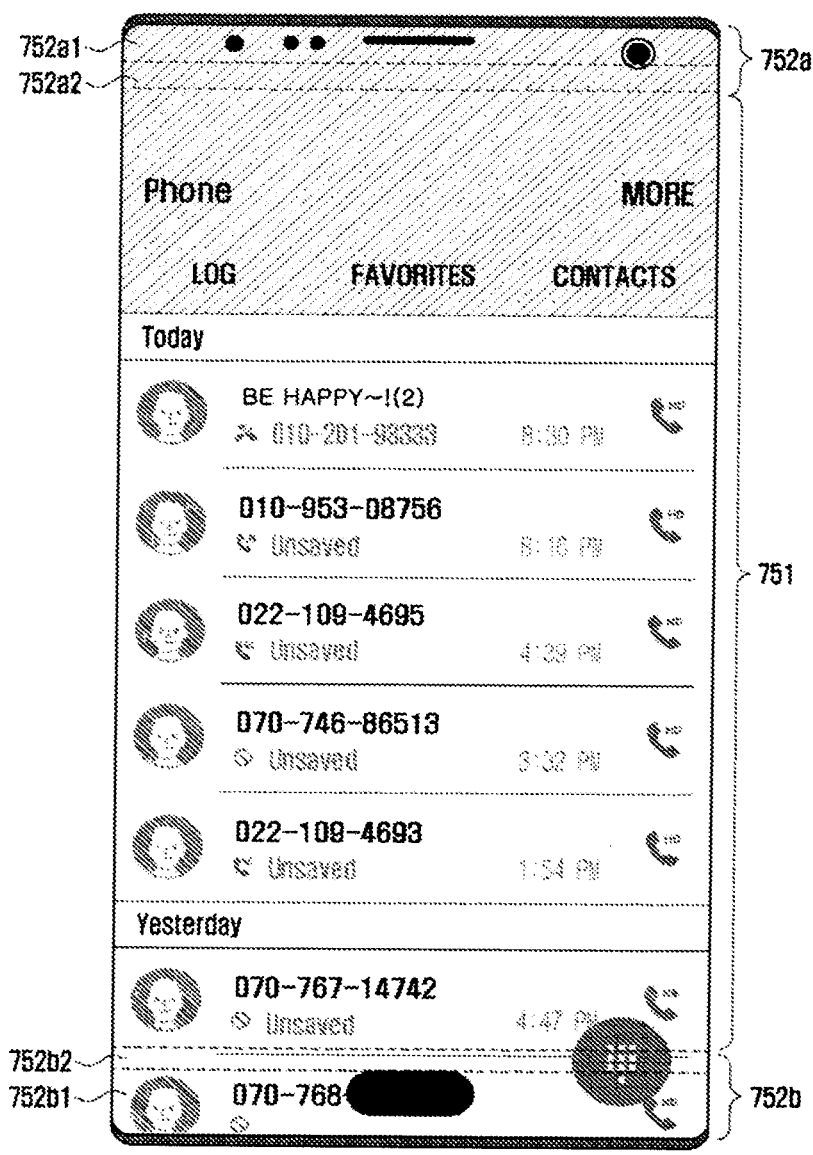

Referring to FIG. 9F, an application screen (e.g., a call application screen 953) can be displayed on an entire screen including the main area 751, the first enlarged area 752a, and the second enlarged area 752b.

Prior to analysis of the first area 751a1 and the second area 751a2, the processor 210 may display a call application screen 953 on the main area 751. When there is no setting (e.g., one of interference enlargement and non-interference enlargement), the processor 210 may display the call application screen 953 on the main area 751.

The processor 210 may analyze the first area 751a1 and the second area 751a2 of the call application screen 953 and determine one of the interference enlargement and non-interference enlargement with respect to the call application screen 953. Depending on the analysis result (e.g., below a threshold), the processor 210 may perform interference enlargement of the call application screen 953. Depending on the analysis result (e.g., below a threshold), the processor 210 may display the call application screen 953 in an enlarged form on the entire screen.

The aforementioned application (e.g., call application) is one example and it is not limited thereto, and can be an application (e.g., music application, video application, etc.) preinstalled in the electronic apparatus 201, or an application which is downloadable and installable.

Figure 9G:
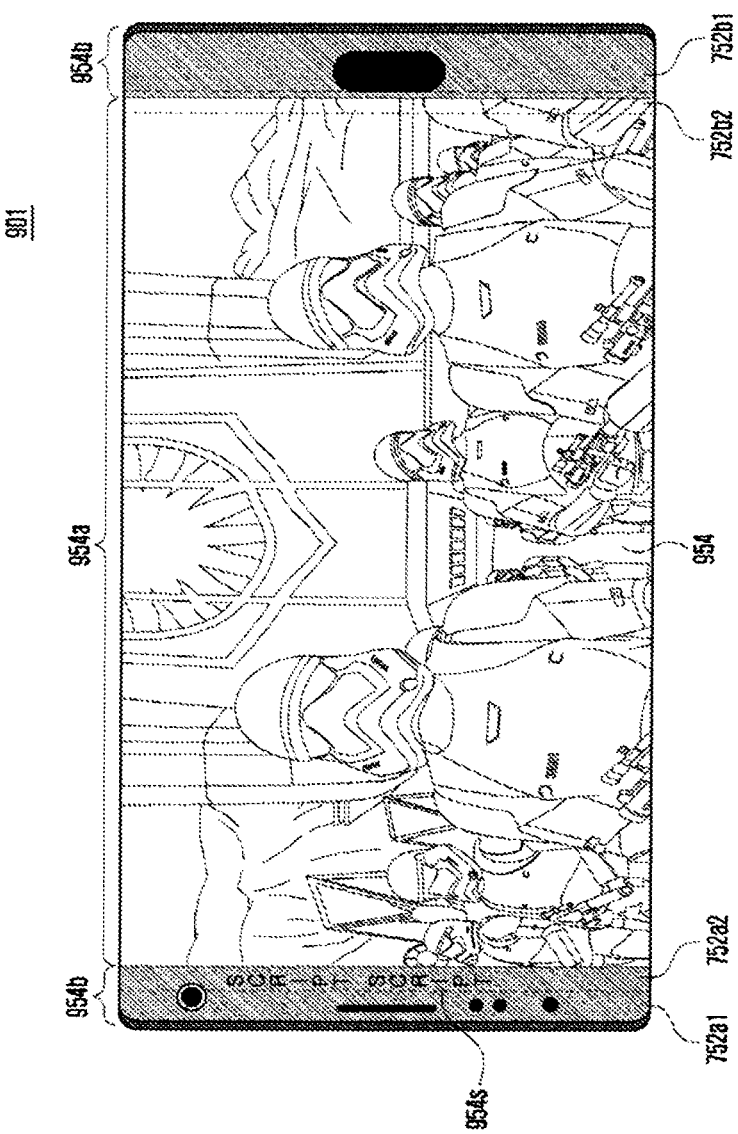
Figure 9H:
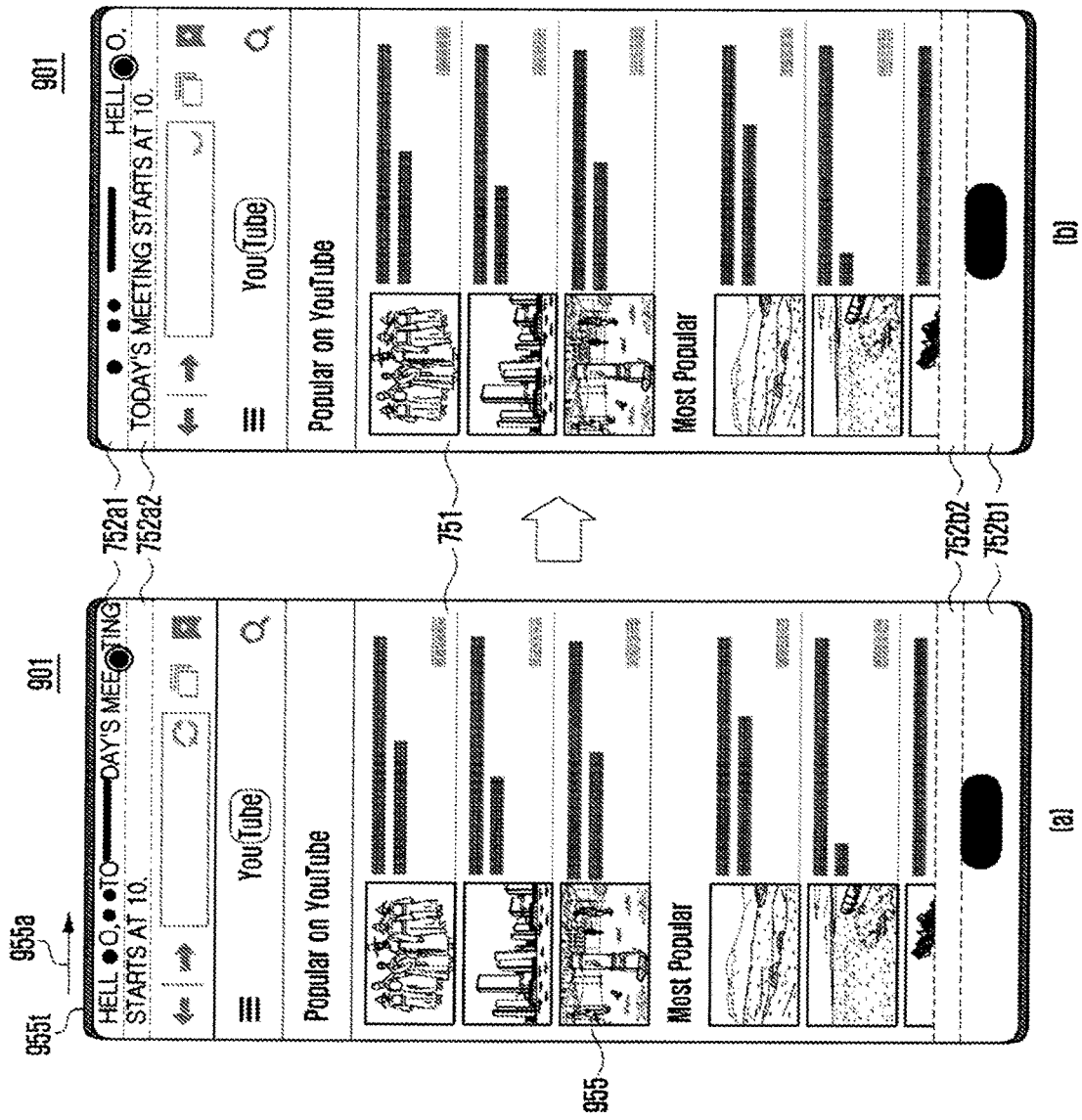
Figure 9I:
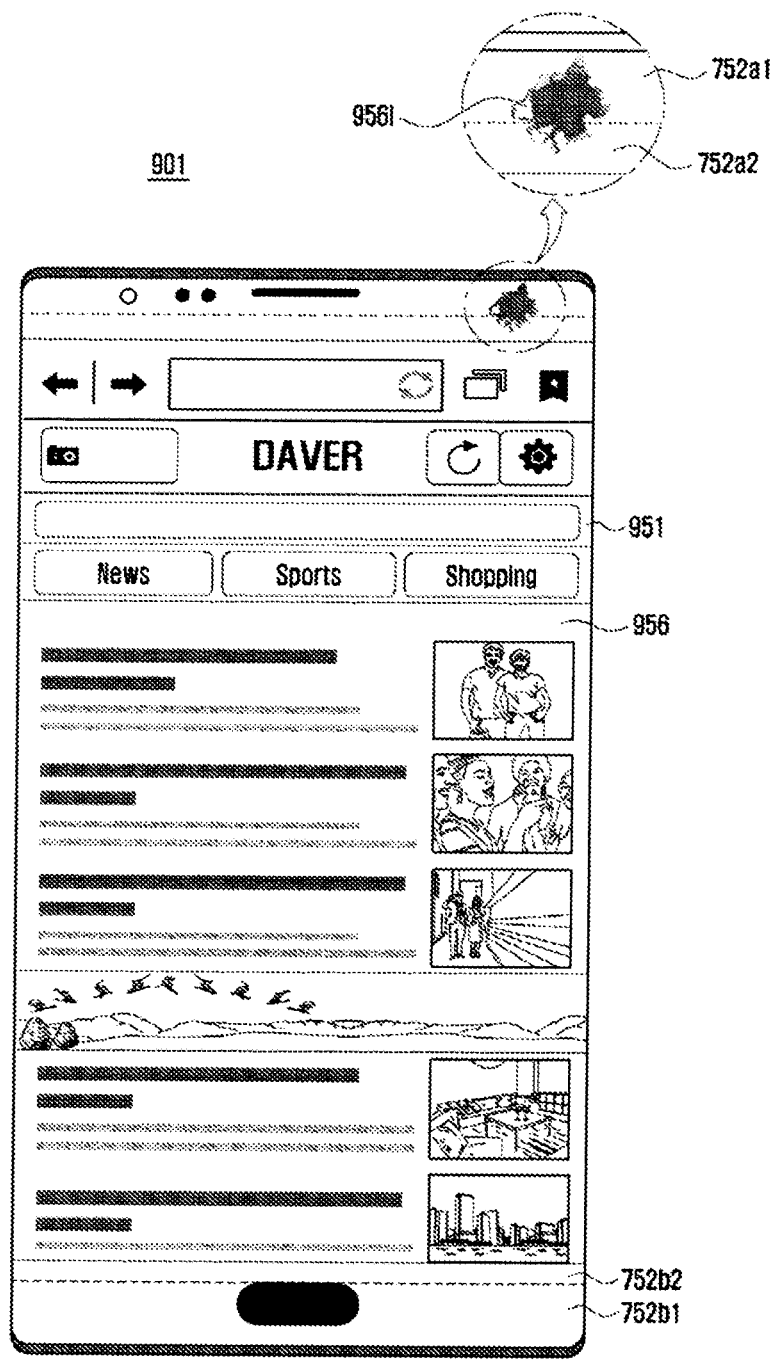
Figure 9J:
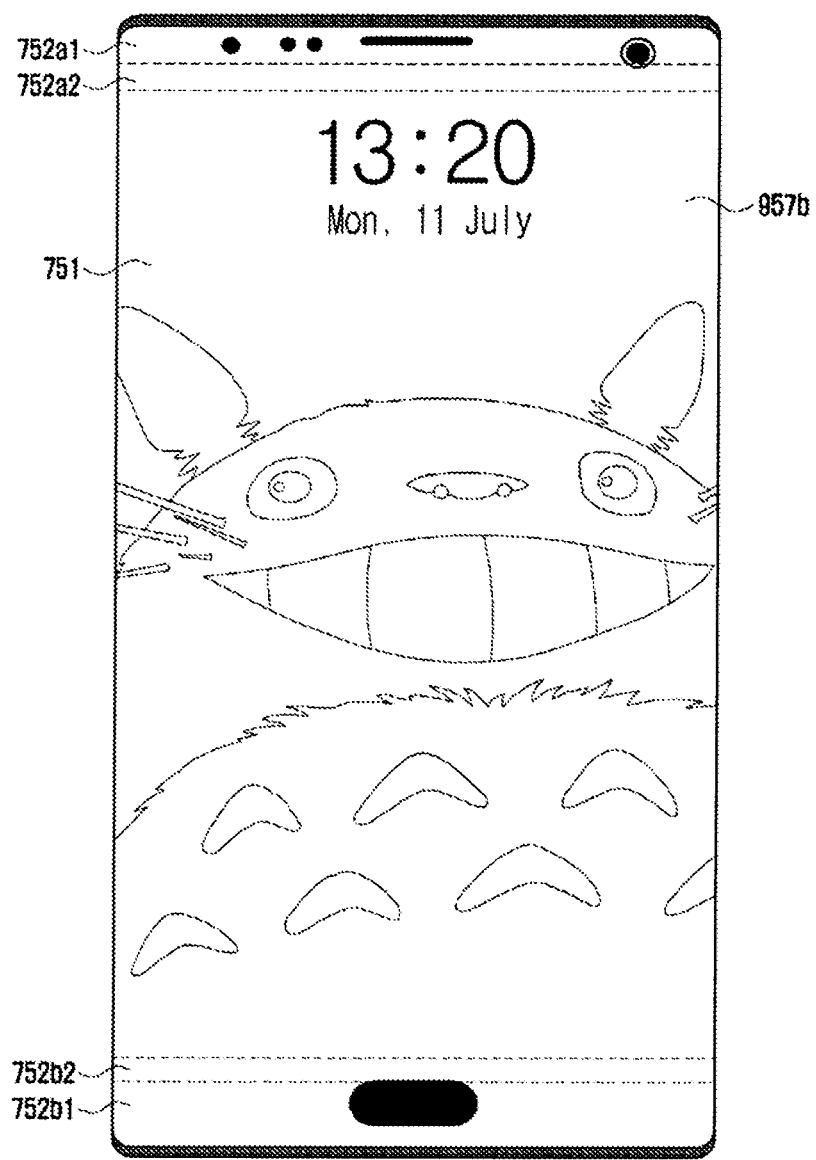
Figure 9K:
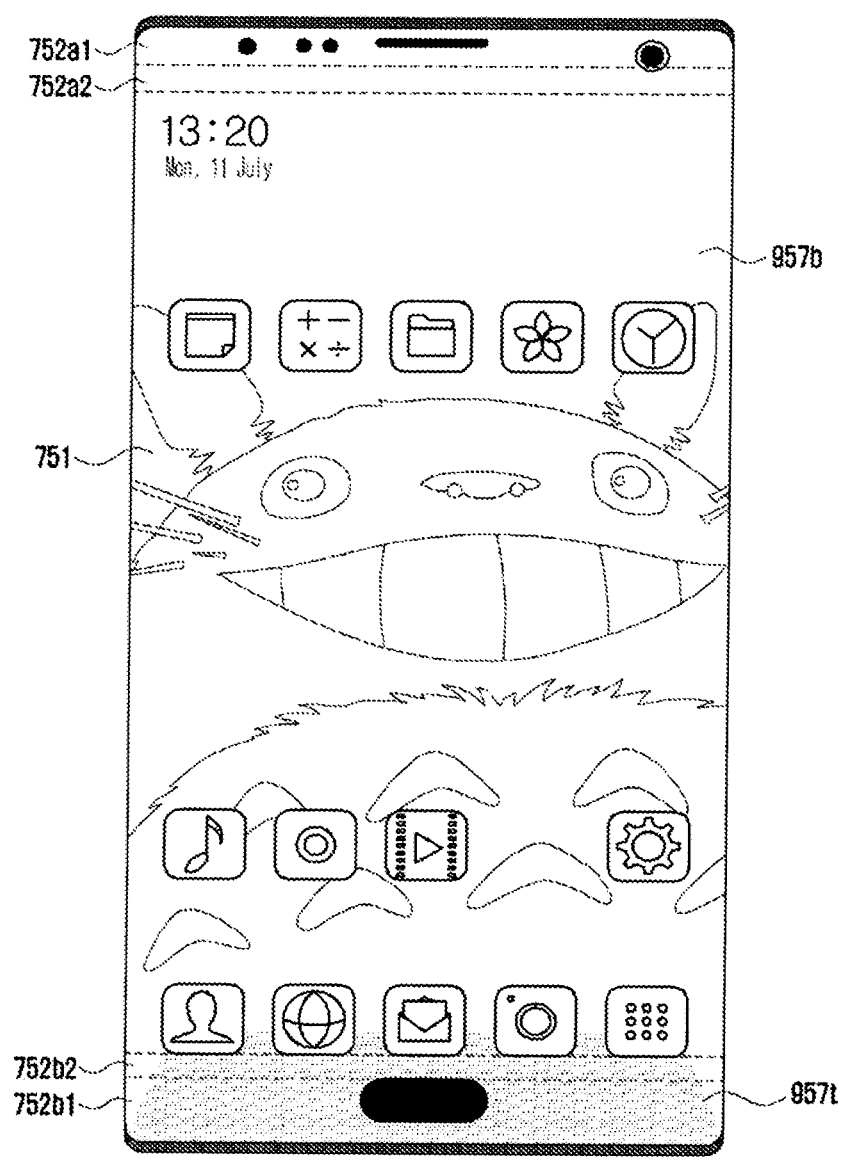

Referring to FIGS. 9J and 9K, an example of an image enlarged to an entire screen is illustrated.

FIG. 9J may be a lock screen. In the lock screen an image 957b can be enlarged to an entire screen including the main area 951, the first enlarged area 952a, the second enlarged area 952b and displayed. The processor 210, according to an analysis result (e.g., less than a threshold value), may enlarge the image 957b to an entire screen including the main area 951, the first enlarged area 952a, the second enlarged area 952b and displayed.

FIG. 9K may be, for example, a home screen. On the home screen, the image 957b may be enlarged and displayed on the entire screens including the main area 951, the first enlarged area 952a, the second enlarged area 952b. The processor 210 may enlarge and display the image 957b on the entire screens including the main area 951, the first enlarged area 952a, the second enlarged area 952b according to the analysis result (for example, less than a threshold value). The processor 210 may place a tray (957t), which is displayed after a shortcut and a shortcut icon on the home screen, from a hole, an opening, or an incision in the front side in a non-interference manner.

The tray 957t may have transparency (e.g., 60-80%, changeable upon setting). In addition, the tray 957t may be indicated as a shortcut icon or a color which is different from the enlarged image 957b.

In Operation 850 of FIG. 8, when an enlarged image is displayed on a full screen, a method for controlling a hole area of the electronic apparatus is completed.

Referring back to Operation 840 of FIG. 8, when it is not entire enlargement of an image (e.g., partial enlargement of an image), Operation 860 of FIG. 8 will be applied.

In Operation 860 of FIG. 8, a partially enlarged image is displayed on a full screen.

Referring to FIG. 9D, the processor 210 may enlarge an image (for example, 951-10) and display it on a partial area of the entire screen. The processor 210 can enlarge and display the image 951-10 on a partial area of the entire screen according to the analysis result. A partial area of the entire screen may mean a main area 751 and a first enlarged area 752a (FIG. 9D) or a main area 751 and a second enlarged area 752b. Some areas of the entire screen may be 1440×2776 pixels in size.

In one exemplary embodiment, a partial area of the added full screen can further include one of the twelfth enlarged area 752a2 and twenty second enlarged area 725b2. The processor 210 may enlarge an image (e.g., 951-10) and display on a partial area of the added full screen.

The added partial area of the entire screen may include a main area 751, a first enlarged area 752a, and a twenty-second enlarged area 752b2. Also, a part of the added full screen may include a main area 751, a second enlarged area 752b, and a twelfth enlarged area 752a2. In an exemplary embodiment, the size of a part of the entire screen may be 1440×2856 pixels.

A size of a partial area of an entire screen can change according to a screen size and/or aspect ratio of the electronic apparatus 701. In addition, a size of a partial area of the added full screen can change according to a screen size and/or aspect ratio of the electronic apparatus 701.

In Operation 860 of FIG. 8, when an enlarged image is displayed on a partial area (or a partial area of the added entire screen) of the entire screen, a method for controlling a hole area of the electronic apparatus ends.

Back to Operation 830 of FIG. 8, if it is not interference enlargement of an image (e.g., non-interference enlargement), Operation 870 of FIG. 8 will be applied.

In Operation 870 of FIG. 8, non-interference enlargement of an image is determined.

The processor 210 may determine whether the image is subject to non-interference enlargement. Non-interference enlargement of an image may be determined by analyzing the first area 751a1 of the image (e.g., 951-13) (e.g., exceeding a threshold) or analyzing the second area 751a2 (e.g., exceeding a threshold) to the twelfth region 752a2 and to the 22nd enlarged area 752b2.

According to an analysis result, if the first area 751a1 and the second area 751a2 of the image (e.g., 951-13) exceed a threshold value, the processor 210 may determine non-interference enlargement of an image.

According to the determination of non-interference enlargement of an image, the processor 210 may enlarge the image (e.g., 951-13) to the main area 751, the twelfth enlarged area 752a2, and the twenty second enlarged area 752b2.

In Operation 870 of FIG. 8, in case of non-interference enlargement of an image, Operation 880 of FIG. 8 will be applied. In Operation 830 of FIG. 8, it is not non-interference enlargement of an image, 890 of FIG. 8 will be applied.

In Operation 880 of FIG. 8, an image which is subject to non-interference enlargement is displayed on an entire screen.

Referring to FIG. 9E, the processor 210 may enlarge an image (for example, 951-13) and display it on a partial area of the entire screen (for example, non-interference areas 951, 952$a$2, and 952$b$2). The processor 210 may enlarge and display the image 951-13 on the non-interference areas, main area 951, first enlarged area 952$a$2, and second enlarged area 952$b$2 of the full screen according to the analysis result. The non-interference area of the full screen may mean the main area 751 and the first enlarged area 752$a$, or the main area 751 and the second enlarged area 752$b$ of FIG. 7. The size of the non-interference area of the full screen may be 1440×2710 pixels. The size of the non-interference area may be 90.6% of the size of the entire screen.

A size of non-interference area of an entire screen can change according to a size of a screen of electronic apparatus 701 and/or aspect ratio. In addition, a size of the non-interference area of an entire screen can change according to position and/or size of a hole, an opening or an incision of the electronic apparatus 701.

In Operation 880 of FIG. 8, when an enlarged image is displayed on the non-interference area of the entire screen, a method for controlling a hole area of the electronic apparatus ends.

Referring back to Operation 870 of FIG. 8, when it is not non-interference enlargement, Operation 890 of FIG. 8 is applied.

In Operation 890 of FIG. 8, an image is displayed on a main area.

If no interference enlargement and non-interference enlargement are applied to the image (or interference enlargement and non-interference enlargement are not set for the image), the processor 210 may display an image (e.g., 951-17) on the main area 751. The size of the main area of the full screen may be 1440×2560 pixels. The size of the main area may be 85.6% of the size of the entire screen.

In an exemplary embodiment, in case of a video application which is running, a transcript 954$s$ can be displayed on enlargement areas 752$a$, 752$b$. In addition, a text (or script) can be displayed on one side (e.g., enlarged areas 752$a$. 752$b$) of an application screen displayed on the main area 751.

Referring to FIG. 9G, a video application screen 954 can be displayed on an entire screen 951, 952$a$, 952$b$. In addition, the video application screen 954 can be displayed on the main area 751.

Before analyzing the first area 751$a$1 and the second area 751$a$2, the processor 210 may display the video application screen 954 in the main area 751. The processor 210 may display the video application screen 954 in the main area 751 if there is no setting (e.g., one of interference enlargement and non-interference enlargement).

The processor 210 may analyze the first area 751$a$1 and the second area 751$a$2 of the video application screen 954 and determine one of interference enlargement and non-interference of the video application screen 954. Depending on the result of the analysis (e.g., below the threshold), the processor 210 may enlarge the video application screen 954. According to the analysis result (for example, a threshold value or less), the processor 210 can enlarge and display the video application screen 954 on the entire screen.

According to the analysis result (for example, the exceeding the threshold value), the processor 210 can display the video application screen 954 in the main area 751. Further, according to the analysis result (for example, exceeding the threshold value), the processor 210 may display the video application screen 954 in the main area 751 and the twenty-second enlarged area 752$b$2.

The video application screen 954 may include a video display area 954$a$ and a text providing area (or a caption area 954$b$). The video display area 954$a$ may be the main area 751. The video display area 954$a$ may include a main area 751 and a part of the first enlarged area 752$a$. The video display area 954$a$ may include a part of the main area 751 and the second enlarged area 752$b$. In addition, the video display area 954$a$ may include a main area 751, a part of the first enlarged area 752$a$ and a part of the second enlarged area 752$b$.

The text providing area 954$b$ may be one or plural. The text providing area 954$b$ may include some or all of the first enlarged area 752$a$. The text providing area 954$b$ may include some or all of the second enlarged area 752$b$. Further, the text providing area 954$b$ may include a part of the first enlarged area 752$a$ and a part or all of the second enlarged area 752$b$.

In an exemplary embodiment, the processor 210 may display a video on a video display area (or main area 954$a$), and respectively display script 954$s$ on a text providing area (or a part of the enlarged area 954$b$).

In the text providing area 954$b$, the background of the caption 954$s$ may be black, white or gray. Further, in the text providing area 954$b$, the background of the caption 954$s$ may be a single color background or a multicolor background. In the text providing area 954$b$, the color of the caption 954$s$ may be sufficient if it is distinguished from the background.

The direction (or flow) of the caption 954$s$ can be determined corresponding to the orientation of the electronic apparatus 901. For example, when the orientation of the electronic apparatus 901 is in landscape orientation, the orientation of the caption 954$s$ may be in portrait orientation. In addition, when the orientation of the electronic apparatus 901 is in portrait orientation, the orientation of the caption 954$s$ may be in landscape orientation.

In the text providing area 954$b$, the caption 954$s$ can be displayed in a certain area (for example, the twelfth enlarged area 752$b$2 that is not interfered with by a hole, an opening, or an incision). The caption 954$s$ in the text providing area 954$b$ may be displayed in some areas (for example, the twelfth enlarged area 752$a$2 or the twenty second enlarged area 752$b$2).

In an exemplary embodiment, on one side (e.g., an enlarged area 752$a$, 752$b$) of the application screen displayed on the main area 751, text (e.g., alarm or notification, etc., 955$t$) can be displayed.

Referring to FIG. 9H, the executed application screen (e.g., web browser, etc., 955) can be displayed on the main area 751.

The processor 210 may analyze the first area 751$a$1 and the second area 751$a$2 of the application screen 955 and determine one of the interference enlargement and non-interference enlargement with respect to the application screen 955.

As a result (e.g., exceeding a threshold value), the processor 210 may display the application screen 955 on the main area 751.

Aside from the application screen, a text 955$t$ corresponding to the alarm (or notification) may be displayed on the first enlarged area 752*a* or the second enlarged area 752*b*. The processor 210 may enable the text 955*t* corresponding to the alarm (or notification) to be displayed on the first enlarged area 752*a* or the second enlarged 752*b*.

The processor 210 may incrementally move (e.g., in the direction of arrow 955*a*) or scroll the text 955*t* corresponding to an alarm (or notification) for display in the enlarged area 752*a* or 752*b*. The processor 210 may cause the display area 752*a* or 752*b* to display text (955*t*) corresponding to an alarm (or notification) in a hole, opening or incision position. The processor 210 also gradually moves (e.g., in the direction of arrow 955*a*) the text 955*t* corresponding to the alarm (or notification) displayed in the enlarged area 752*a* or 752*b* to avoid a position of a hole, an opening, and an incision (e.g., non-interference).

In an exemplary embodiment, on a side (e.g., first and second enlarged areas 752*a*, 752*b*) of the application screen displayed on the main area 751, an image (or symbol, icon. 956*i*) can be displayed.

Referring to FIG. 9I, the executed application screen (e.g., web browser, etc., 955) can be displayed on the main area 751. The processor 210 may analyze the first area and the second area of the application screen 956 and determine one of the interference enlargement and the non-interference enlargement application. According to a result (e.g., exceeding threshold value), the processor 210 may display the application screen 956 on the main area 751.

Apart from the application screen, an image 956*i* corresponding to masking can be displayed at the hole, opening, or incision position of the first enlarged area 752*a* or the second enlarged area 752*b*. The processor 210 may cause an image 956*i* corresponding to the masking at a position of the opening or incision to be displayed on at least one of the first enlarged area 752*a* and the second enlarged area 752*b*. The above-described image 956*i* is an example of an image corresponding to a camera (or camera hole, 730). The size of the image 956*i* may be greater than the size of the camera (or camera hole, 730). Also, it is sufficient that the size of the image 956*i* can obscure the size of the camera (or the camera hole, 730).

Not only the aforementioned image but also FIG. 7 illustrates that there are various images corresponding to the position of hole, opening, or incision (an optical sensor hole 720, a receiver hole 725, a camera hole 730, a LED hole 735, home button or fingerprint sensor hole 740, or opening 631), and this could have been easily understood by those skilled in the art.

In Operation 890 of FIG. 8, when an image is displayed on a main area of an entire screen, a method for controlling a hole area of the electronic apparatus ends.

Figure 10:
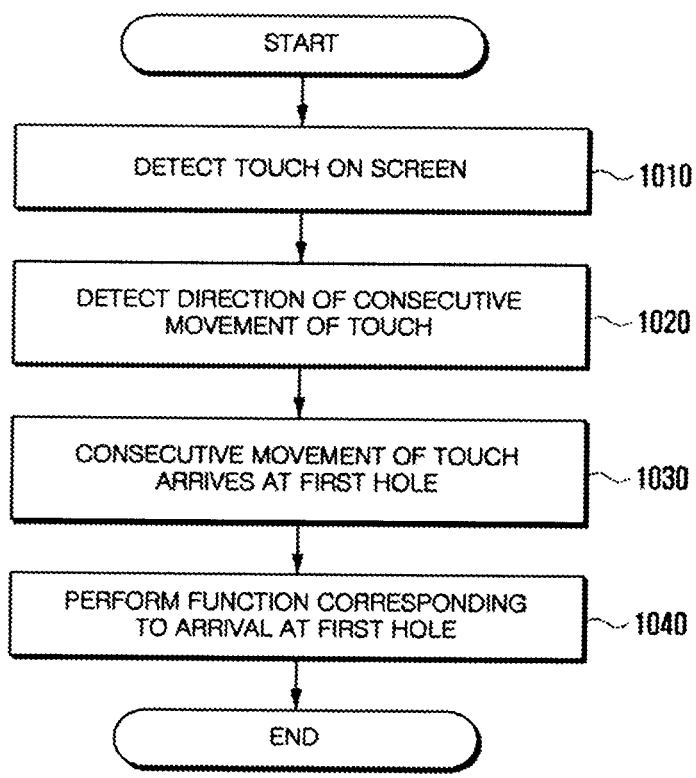
FIG. 10 is a flowchart indicating a method for controlling an electronic apparatus according to another exemplary embodiment.

FIG. 10 is a flowchart indicating a method for controlling an electronic apparatus according to an exemplary embodiment.

FIGS. 11A to 11F are views illustrating an example of a method for controlling an electronic apparatus according to an exemplary embodiment.

In Operation 1010 of FIG. 10, a touch is detected from a screen.

Figure 11A:
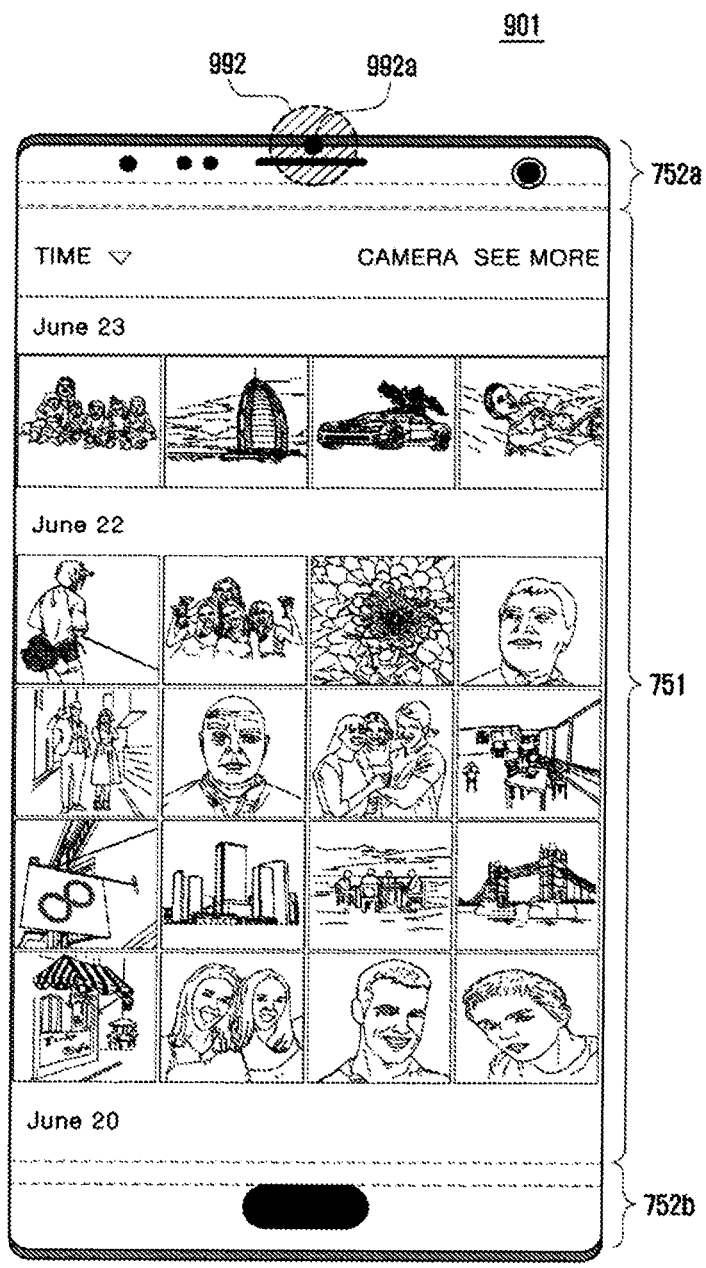

Referring to FIGS. 11A and 11E, an eleventh user input 992 (e.g., touch input or hovering input) is received on the display 950 of the electronic apparatus 901. An eleventh user input 992 is received in a first enlarged area 952*a* of the display 950 of the electronic apparatus 901. Also, an eleventh user input 992 is received in a first enlarged area 952*a* that continues to the main area 751 where the application (e.g., photo application, etc.) is displayed.

Referring to FIG. 11E, the eleventh user input 992 may be received at an outer area 726 of the first hole (camera hole 730 or receiver hole 725). The aforementioned first hole can correspond to opening or incision (an optical sensor hole 720, a receiver hole 725, a camera hole 730, a LED hole 735, home button hole 740, or opening 631, etc. For example, when the first hole is a camera (or camera hole 730), the second hole can correspond to the optical sensor.

In 1100A of FIG. 11E, the distance (d1) between the external area 726 and the first hole (camera or camera hole 730) can be 2.5 mm. In addition, the distance (d1) between the external area 726 and the first hole (camera hole 730 or receiver hole 725) can be 1 mm≤d1≤18 mm. The aforementioned distance (d1) is one exemplary embodiment and can be different.

In 1100B of FIG. 11E, the distance d2 between the first outer region 726 and the first hole (camera hole 730 or receiver hole 725) may be 2.5 mm. The distance d3 between the first outer region 726 and the second outer region 727 may be 2.0 mm. The distance d2 between the first outer region 726 and the first hole (camera hole 730 or receiver hole 725) may be 1 mm≤d1≤10 me. The distance d3 between the first outer region 726 and the second outer region 727 may be 1 mm≤d1≤8 mm. It is also possible to detect an input used precisely by the first outer region 726 and the second outer region 727. The distances d2 and d3 described above are one example and may be different.

The aforementioned application (e.g., photo application) is an example, and other applications (e.g., web browser, etc.) which can be executed or installed in the electronic apparatus 901 are also applicable.

The processor 210, using the panel 262, may detect the eleventh user input 992. The processor 210, using an electric signal received from the panel 262, may calculate the position of the eleventh user input 992*a* (e.g., X11 and Y11 coordinates) corresponding to the eleventh user input 992.

The processor 210 may store the position of the eleventh user input 992, touch detection time (e.g., 11:16 a.m.) of the detected touch, and touch information corresponding to touch in the memory 230.

In Operation 1020 of FIG. 10, a direction of a consecutive movement of a touch is detected.

Figure 11B:
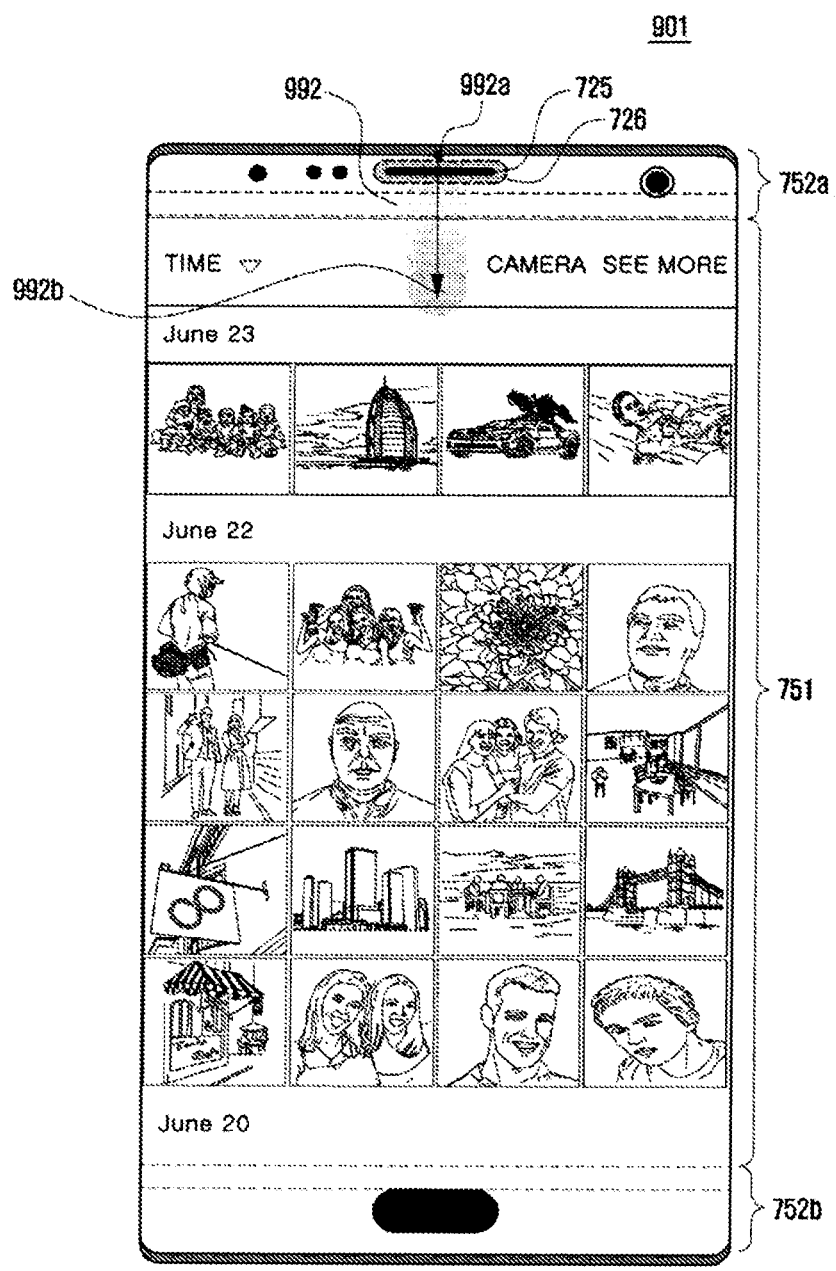

Referring to FIG. 11B, a consecutive movement of the eleventh user input 992 (e.g., touch input or hovering input) is received from the display 950 of the electronic apparatus 901.

The processor 210 may use the panel 262 to detect successive movements of the eleventh user input 992 (e.g., a plurality of X and Y coordinates corresponding to successive touches). The processor 210 uses the electrical signal received from the panel 262 to determine a continuous movement position (e.g., a plurality of X coordinates and a plurality of Y coordinates, 992*a* through 992*b*) of the eleventh user input 992.

The continuous movement of the eleventh user input 992 in the first outer region 726 (e.g., movement from the initial position 992*a* to the last position 992*b*) can mean a gesture (touch gesture). The continuous movement of the eleventh user input 992 in the first outer region 726 (e.g., movement from the initial position 992*a* to the camera (or camera hole 730)) input to the display 750 can mean a touch gesture. In addition, in the first outer area 726, a continuous movement (e.g., movement from the initial position 992*a* through the camera (or camera hole 730) to the first outer area 726) of the eleventh user input 992 can indicate a touch gesture which is input to the display 750.

The touch gesture of the display 750 may include swipe, drag, or flick with the position 992a of the input of the eleventh user input 992 as the first position.

The processor 210, by using consecutive movement position of the eleventh user input 992, may determine a direction of consecutive movement of the eleventh user input 992. In FIG. 11B, the processor 210 may determine a direction of consecutive movement of the eleventh user input 992 as a direction of the 725.

In Operation 1030 of FIG. 10, consecutive movement of a touch arrives the first hole.

Referring to FIG. 11B, successive movements of the eleventh user 992 input arrive at the first hole 725. Also, successive movements of the eleventh user input 992 may pass through the first hole 725. The processor 210 may determine the arrival of the first hole 725 of successive movements of the eleventh user input 992 using the continuous movement position of the eleventh user input 992 that is stored.

In Operation 1040 of FIG. 10, a function to correspond to arrival of the first hole 725 is performed.

Figure 11C:
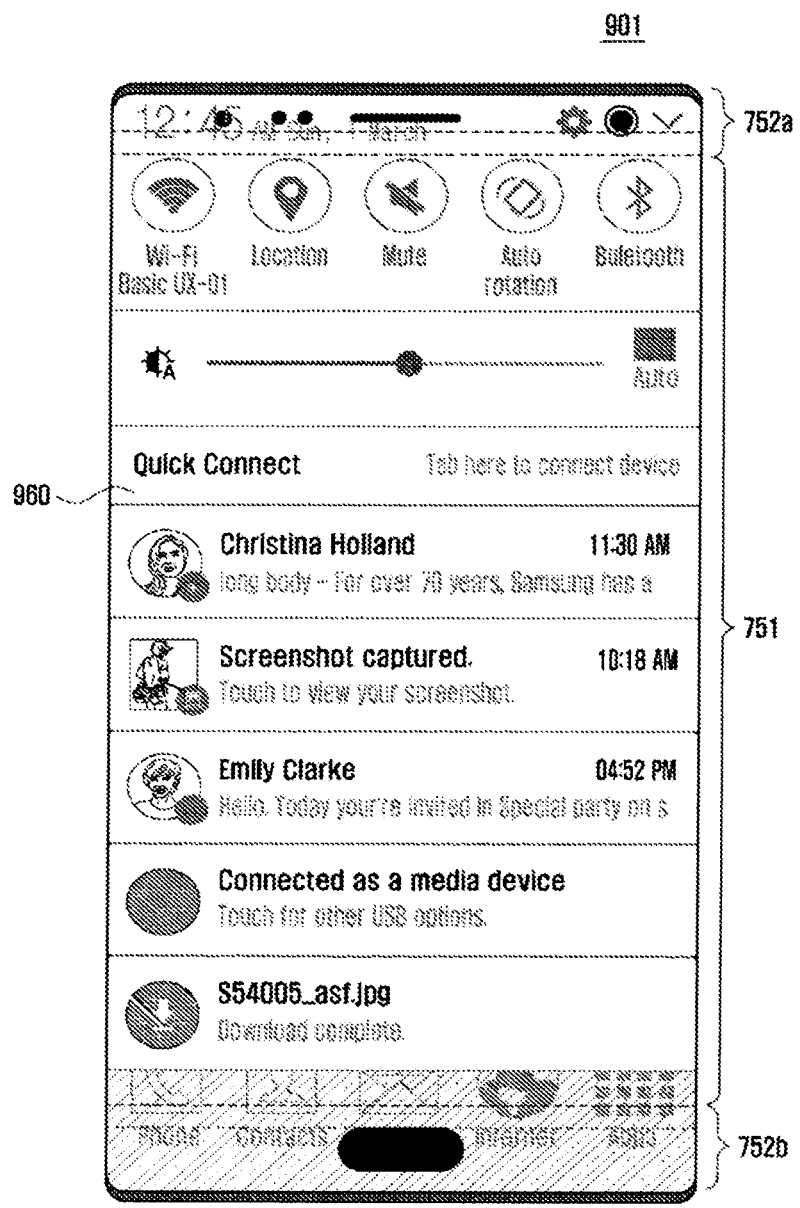

Referring to FIG. 11C, the processor 210 may call a quick panel in response to the arrival of the first hole (camera hole 730 or receiver hole 725) of a continuous movement of the eleventh user input 992. The processor 210 may perform a function (e.g., a quick panel 960 calling) corresponding to the arrival of the first hole 750 of consecutive movements of the eleventh user input 992. The processor 210 may perform a function corresponding to the arrival of the first hall 750 of consecutive movements of the eleventh user input (e.g., only calling a configuration panel (not shown)). A call to quick panel 960 may include a call to a configuration panel (not shown).

The processor 210 may perform a function corresponding to arrival of consecutive movement of the eleventh user input 992 to the nth hole. The processor 210, in response to arrival of the consecutive movement of the eleventh user input 992 to the nth hole, may perform a preset function.

For example, if the second hole is a camera or a camera hole 730, the processor 210 may respond to the arrival of the second hole of the continuous movement of the eleventh user input 992, and can perform a screenshot function. If the third hole is a receiver or receiver hole 725, the processor 210 may perform one of voice recording. S voice accessibility, or the like, corresponding to the arrival of the third hole 725 of the continuous movement of the eleventh user input 992. When the fourth hole is a home button hole 740, the processor 210 may perform a fingerprint recognition and a Samsung pay, in response to the arrival of the fourth hole of the continuous movement of the eleventh user input 992.

In an exemplary embodiment, function corresponding to the aforementioned n hole can be embodied as not only arrival of the consecutive movement of the eleventh user input 992 to the n hole but also receiving of the input of the eleventh user 992 at the n hole.

As illustrated in 1100A or 1100B of FIG. 11E, when the eleventh user input 992 is detected at the outer area 726 of the nth hole, the first outer area 726, and the second outer area 727, the processor 210 may perform a function corresponding to the nth hole.

In an exemplary embodiment, an application screen (e.g., web browser, etc.) is displayed on an entire screen, including main area 751, first enlarged area 752a, and second enlarged area 752b.

Figure 11D:
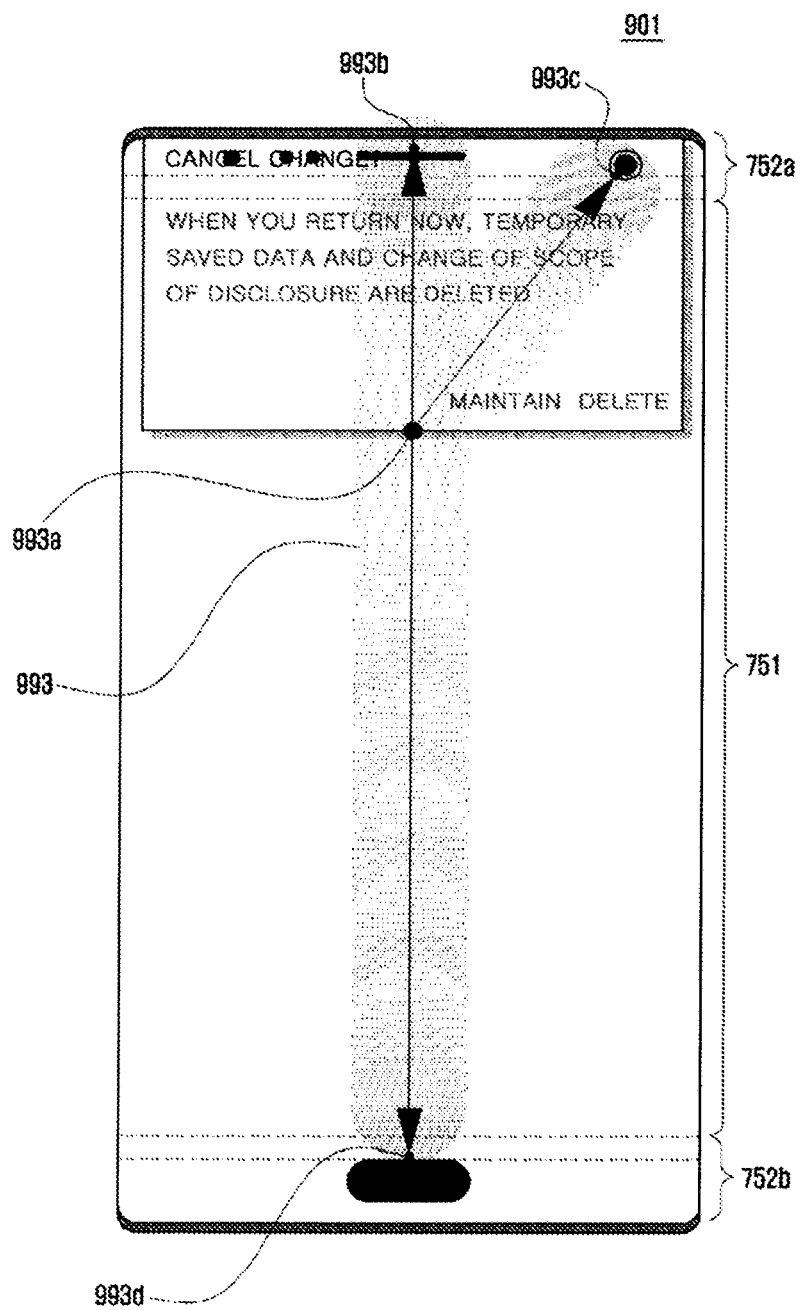

Referring to FIG. 11D, at an upper end of a screen (e.g., a part of the first enlarged area 752a included), head-up notification 961 can be displayed. In addition, at a main area of a screen, the head-up notification 961 can be displayed.

The processor 210 may perform a function corresponding to the arrival of the eleventh hole of the continuous motion of the twelfth user input 993. The eleventh hole may be, for example, a receiver hole 725, a camera hole 730, and a fingerprint sensor hole 740. The eleventh hole may further include an optical sensor hole 720. In addition, the eleventh hole may include a front hole or a rear hole (e.g., a back camera hole, a led hole, etc.) of the electronic apparatus 901.

The twelfth user input 993 is received to the head-up notification 961 by a user. The user may input consecutive movements from the first position 993a of the twelfth user input 993 to the final position (e.g., 993b, 993c, or 993d).

The processor 210 may perform a function corresponding to the arrival of the consecutive movement (e.g., from the first position 993a to the final position (e.g., 993b, 993c, or 993d) of the twelfth user input 993.

Arrival of the consecutive movement of the twelfth user input 993 to the eleventh hole is substantially the same as the arrival of the consecutive movement of the eleventh user input to the first hole (e.g., difference of a user input) and thus, repetitive explanation will be omitted.

The function corresponding to the eleventh hole arrival of the continuous movement of the twelfth user input in the head-up notification 961 may include a head-up notification maintenance (from the initial position 993a to the final position 993b), head-up notification deletion (from the initial position 993a to the final position 993c), or a head-up notification storage (from the initial position 993a to the final position 993d). The functions described above are only one example, and the function provided by the electronic apparatus 901 is sufficient.

In an exemplary embodiment, visual feedback 995a to 995f corresponding to the consecutive movement (or user input) is provided.

Figure 11F:
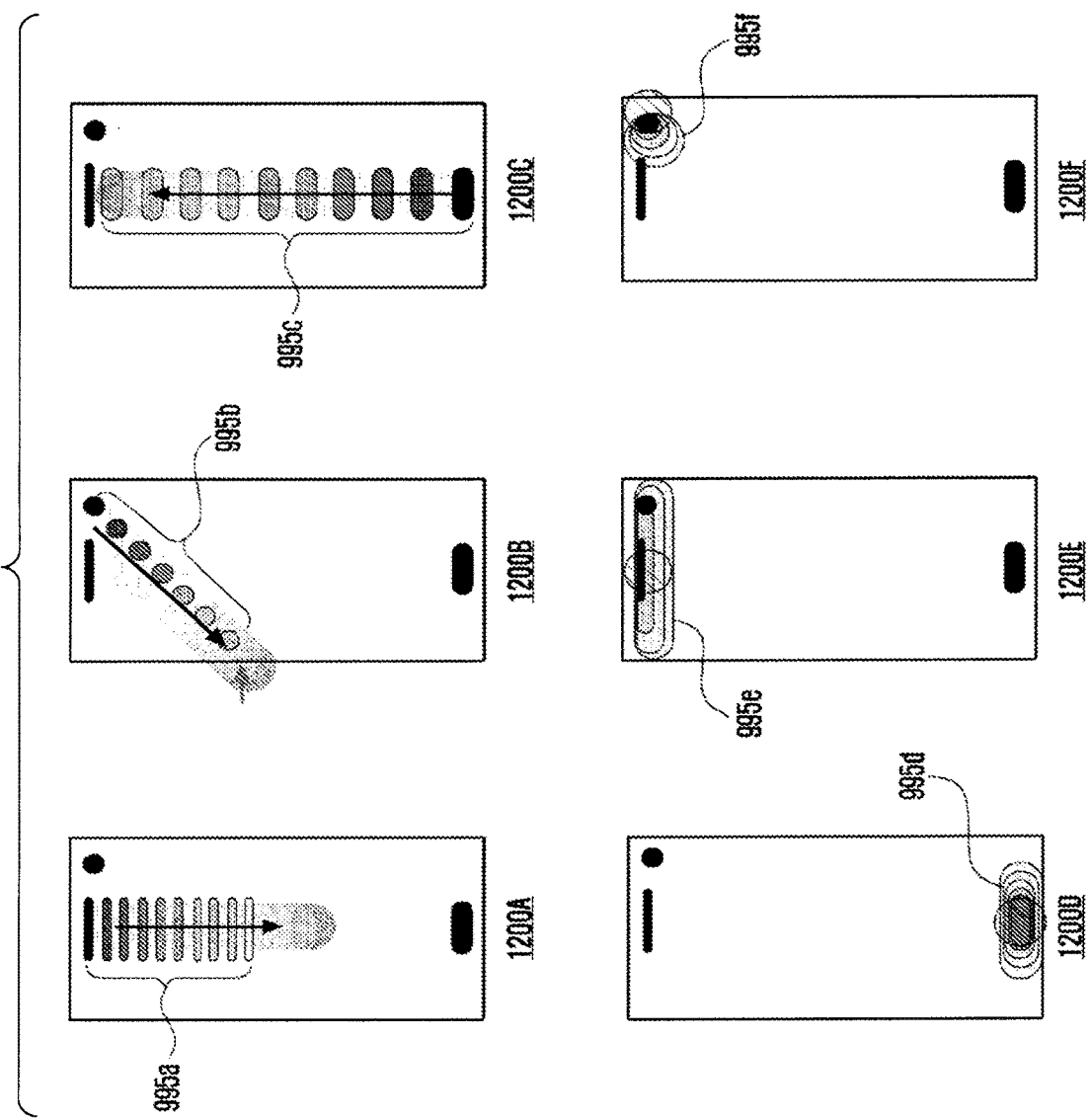

Referring to 1200A, 1200B, and 1200C of FIG. 11F, the processor 210 may provide visual feedback 995a to 995c corresponding to consecutive movement of the received user input.

The visual feedback 995a to 995c may be displayed corresponding to the direction, or trajectory, of the continuous movement of the user input. The visual feedback 995a to 995c may be displayed using a shape of the hole corresponding to the initial position of the received user input (e.g., circular, oval, etc.). In addition, the visual feedback 995a to 995c may be used to indicate the direction of continuous movement of the user input using color and brightness added to the shape of the hole (e.g., circle, oval, etc.) corresponding to the initial position of the received user input.

Referring to 1200D, 1200E, and 1200F of FIG. 11F, the processor 210 may provide visual feedback 995e to 995f corresponding to the received user input.

The visual feedback 995e to 995f may be displayed to correspond to a received user input. The visual feedback 995e to 995f may be displayed using a shape of a hole (e.g., circular, oval) corresponding to a position of the received user input. In addition, the visual feedback 995e to 995f may be displayed to be gradually extended using color and brightness added to the shape of a hole (e.g., circular, oval) corresponding to the initial position of the received user input.

In Operation 1040 of FIG. 10, if a function corresponding to the arrival of the first hole is performed, a method for controlling a hole area of the electronic apparatus is to end.

An electronic apparatus according to an exemplary embodiment is an electronic apparatus having at least one hole area in a display, including operations of selecting a displayed content, determining interference enlargement and non-interference enlargement through edge analysis of the content, and enlarging the content to one of the interference enlargement and the non-interference enlargement, and the hole area may be formed by one of a camera, receiver, optical sensor, and a home button.

In an exemplary embodiment, the display may include a main area and an enlarged area, and the hole area can be located in the enlarged area.

In an exemplary embodiment, the enlarged area may be divided into the first enlarged area located at an upper end of the main area and the second enlarged area located at a lower end of the main area.

In an exemplary embodiment, the first enlarged area may be divided into the eleventh enlarged area where one hole area is positioned from among the hole areas and the twelfth enlarged area located at a lower end of the eleventh enlarged area.

In an exemplary embodiment, the second enlarged area may be divided into the twenty first enlarged where another hole area is positioned from among the hole areas, and the twenty second enlarged area located at an upper end of the twenty first enlarged area.

In an exemplary embodiment, the main area is divided into the first area connected to the first enlarged area and the second area connected to the second enlarged area, and the edge analysis of the content can include edge analysis of the content corresponding to the first area and edge analysis of the content corresponding to the second area.

In an exemplar) embodiment, the interference enlargement may be enlargement which limits enlargement of the content by the hole area, and the non-interference enlargement may be enlargement which does not limit enlargement of the content by the hole area.

In an exemplary embodiment, the interference enlargement may enlarge and display the content in the interference area of the display and the interference area of the display may include the main area and the enlarged area.

In an exemplary embodiment, the interference enlargement may limit display of a part of an area of the content which is enlarged by the hole area.

In an exemplary embodiment, the non-interference enlargement may enlarge and display the content in the non-interference area of the display and the non-interference area of the display may include the main area and a part of the enlarged area.

In an exemplary embodiment, a space of the first enlarged area can be different from a space of the second enlarged area.

In an exemplary embodiment, a space of the eleventh enlarged area can be different from a space of the twelfth enlarged area.

In an exemplary embodiment, a space of the twenty first enlarged area and a space of the twenty second enlarged area can be different.

In an exemplary embodiment, a space of the enlarged area can be wider than a space of one area out of the first area and the second area.

In an exemplary embodiment, the hole area can correspond to the camera and one hole area can be located in the first enlarged area.

In an exemplary embodiment, the hole area may include one of a hole, an opening, and an incision.

Here, a program is stored in a non-transitory recording medium recordable by computer, and read and executed by computer, the exemplary embodiments of the present disclosure can be implemented.

The non-transitory computer-recordable medium is not a medium configured to temporarily store data such as a register, a cache, or a memory but an apparatus-readable medium configured to semi-permanently store data. Specifically, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and provided therein.

The foregoing exemplary embodiments and advantages are merely exemplary and are not to be construed as limiting the inventive concept. The exemplary embodiments can be readily applied to other types of device or apparatus. Also, the description of the exemplary embodiments is intended to be illustrative, and not to limit the scope of the inventive concept, and many alternatives, modifications, and variations will be apparent to those skilled in the art.

What is claimed is:

1. An electronic apparatus, comprising:
   a display;
   a memory storing information related with a hole, an opening, or an incision positioned in the display; and
   a processor configured to:
   display a first image on a first area of the display, the first area surrounding at least a portion of the hole, at least a portion of the opening, or at least a portion of the incision; and
   display a second image on a second area of the display, the second area being positioned away from the hole, the opening, or the incision,
   wherein the first area and the second area are divided based on the information.

2. The electronic apparatus as claimed in claim 1, wherein the processor is configured to display the first image as a portion of a content and the second image as another portion of the content based on a determined setting related with enlargement of the content.

3. The electronic apparatus as claimed in claim 1, wherein the processor is configured to enlarge the content and display the enlarged content on the first area and the second area based on a determined setting related with enlargement of the content.

4. The electronic apparatus as claimed in claim 1, wherein the processor is configured to:
   execute an application; and
   display an icon as the first image or a text related with the application on the first area.

5. The electronic apparatus as claimed in claim 1, wherein the processor is configured to display at least a portion of the first image around the hole, the opening, or the incision, the at least a portion of the first image being designed to obscure the hole, the opening, or the incision.

6. The electronic apparatus as claimed in claim 5, further comprising an electrical component positioned in or below the hole, the opening, or the incision,
   wherein the at least a portion of the first image is related with the electrical component.

7. The electronic apparatus as claimed in claim 6, wherein a size of the first area is determined based on a reference line related with the electrical component.

8. The electronic apparatus as claimed in claim 6, wherein the electrical component includes a camera, a sensor, a receiver, or a home button.

9. The electronic apparatus as claimed in claim 1, wherein the processor is configured to display the first image and the second image such that color of the first image corresponds to color of an upper portion of the second image.

10. The electronic apparatus as claimed in claim 1, wherein the information includes size information or location information of the hole, the opening, or the incision.

11. An electronic apparatus, comprising:
a display;
a memory storing information related with a hole, an opening, or an incision positioned in the display; and
a processor configured to:
determine whether to display a content of an executed application on a second area, or on a first area and the second area, the first area surrounding at least a portion of the hole, at least a portion of the opening, or at least a portion of the incision, the second area being positioned away from the hole, the opening, or the incision; and
based on the determining, display the content on the display,
wherein the first area and the second area are divided based on the information.

12. A method of controlling an electronic apparatus storing information related with a hole, an opening, or an incision positioned in a display, the method comprising:
displaying a first image on a first area of the display, the first area surrounding at least a portion of the hole, at least a portion of the opening, or at least a portion of the incision; and
displaying a second image on a second area of the display, the second area being positioned away from the hole, the opening, or the incision,
wherein the first area and the second area are divided based on the information.

13. The method as claimed in claim 12, wherein displaying the first image comprises displaying the first image as a portion of a content, and
wherein the displaying the second image comprises displaying the second image as another portion of the content based on a determined setting related with enlargement of the content.

14. The method as claimed in claim 12, further comprising:
enlarging the content and displaying the enlarged content on the first area and the second area based on a determined setting related with enlargement of the content.

15. The method as claimed in claim 12, further comprising:
executing an application; and
displaying an icon as the first image or a text related with the application on the first area.

16. The method as claimed in claim 12, wherein displaying the first image comprises displaying at least a portion of the first image around the hole, the opening, or the incision, the at least a portion of the first image being designed to obscure the hole, the opening, or the incision.

17. The method as claimed in claim 16, further comprising an electrical component positioned in or below the hole, the opening, or the incision,
wherein the at least a portion of the first image is related with the electrical component.

18. The method as claimed in claim 17, wherein a size of the first area is determined based on a reference line related with the electrical component.

19. The method as claimed in claim 12, further comprising:
displaying the first image and the second image such that color of the first image corresponds to color of an upper portion of the second image.

20. The method as claimed in claim 12, wherein the information includes size information or location information of the hole, the opening, or the incision.

* * * * *